(12) United States Patent
Fong et al.

(10) Patent No.: US 7,725,880 B2
(45) Date of Patent: May 25, 2010

(54) METHOD AND SYSTEM OF REMOTE DIAGNOSTIC, CONTROL AND INFORMATION COLLECTION USING A DYNAMIC LINKED LIBRARY

(75) Inventors: Avery Fong, Castro Valley, CA (US); Tetsuro Motoyama, Cupertino, CA (US); Yevgeniya Lyapustina, La Selva Beach, CA (US)

(73) Assignee: Ricoh Company, Ltd., Tokyo (JP)

( * ) Notice: Subject to any disclaimer, the term of this patent is extended or adjusted under 35 U.S.C. 154(b) by 888 days.

(21) Appl. No.: 11/103,436

(22) Filed: Apr. 12, 2005

(65) Prior Publication Data

US 2005/0246439 A1    Nov. 3, 2005

Related U.S. Application Data

(63) Continuation of application No. 09/440,693, filed on Nov. 16, 1999, now Pat. No. 6,948,175.

(51) Int. Cl.
    *G06F 9/44* (2006.01)
(52) U.S. Cl. .................. 717/124; 709/224
(58) Field of Classification Search ......... 717/125–129; 709/224
    See application file for complete search history.

(56) References Cited

U.S. PATENT DOCUMENTS

| | | | |
|---|---|---|---|
| 4,791,565 A * | 12/1988 | Dunham et al. ............ 726/31 |
| 5,333,302 A | 7/1994 | Hensley et al. | |
| 5,349,662 A * | 9/1994 | Johnson et al. ........... 717/127 |
| 5,412,779 A | 5/1995 | Motoyama | |
| 5,537,554 A | 7/1996 | Motoyama | |
| 5,544,289 A | 8/1996 | Motoyama | |
| 5,568,618 A | 10/1996 | Motoyama | |

(Continued)

FOREIGN PATENT DOCUMENTS

JP    2-172348    7/1990

(Continued)

OTHER PUBLICATIONS

U.S. Appl. No. 11/940,785, filed Nov. 15, 2007, Motoyama, et al.

(Continued)

*Primary Examiner*—Wei Y Zhen
*Assistant Examiner*—Phillip H Nguyen
(74) *Attorney, Agent, or Firm*—Oblon, Spivak, McClelland, Maier & Neustadt, L.L.P.

(57) ABSTRACT

A system for monitoring a user's usage of a target application on an application unit. Such a target application can, as examples, be a software program running on a computer or a workstation, an image forming device, an appliance, etc. The application unit includes a user interface with a plurality of commands which a user can select. In the example of the target application being a software program, the commands may be icons displayed on a computer screen which a user can point to with a mouse pointer and then click on. In the case of the application unit being an image forming device or an appliance, the interface may be an operation panel with buttons, a touch pad, etc. which a user can press. The present invention monitors the user's usage of such interfaces and logs data of the user's usage of such interfaces. The logged data can then be communicated by the sending unit to a designated location.

18 Claims, 26 Drawing Sheets

U.S. PATENT DOCUMENTS

| | | | |
|---|---|---|---|
| 5,649,120 | A | 7/1997 | Motoyama |
| 5,649,187 | A * | 7/1997 | Hornbuckle ................. 707/10 |
| 5,675,510 | A | 10/1997 | Coffey et al. |
| 5,774,678 | A | 6/1998 | Motoyama |
| 5,818,603 | A | 10/1998 | Motoyama |
| 5,819,110 | A | 10/1998 | Motoyama |
| 5,887,216 | A | 3/1999 | Motoyama |
| 5,909,493 | A | 6/1999 | Motoyama |
| 5,949,415 | A | 9/1999 | Lin et al. |
| 6,003,070 | A | 12/1999 | Frantz |
| 6,128,502 | A * | 10/2000 | Wizgall et al. ............... 455/461 |
| 6,141,705 | A * | 10/2000 | Anand et al. ................. 710/15 |
| 6,163,802 | A | 12/2000 | Lin et al. |
| 6,167,358 | A | 12/2000 | Othmer et al. |
| 6,192,403 | B1 * | 2/2001 | Jong et al. ................. 709/224 |
| 6,263,457 | B1 * | 7/2001 | Anderson et al. ............. 714/38 |
| 6,317,848 | B1 | 11/2001 | Sorens et al. |
| 6,530,082 | B1 * | 3/2003 | Del Sesto et al. ............... 725/9 |
| 6,581,092 | B1 * | 6/2003 | Motoyama et al. .......... 709/219 |
| 6,615,258 | B1 | 9/2003 | Barry et al. |
| 6,631,247 | B1 | 10/2003 | Motoyama et al. |
| 6,662,225 | B1 | 12/2003 | Motoyama et al. |
| 6,889,263 | B2 | 5/2005 | Motoyama |
| 6,952,726 | B1 * | 10/2005 | White et al. ................. 709/224 |
| 7,024,474 | B2 * | 4/2006 | Clubb et al. ................. 709/223 |
| 7,053,767 | B2 | 5/2006 | Petite et al. |
| 7,103,511 | B2 * | 9/2006 | Petite ......................... 702/188 |
| 7,131,070 | B1 | 10/2006 | Motoyama et al. |
| 7,188,151 | B2 * | 3/2007 | Kumar et al. ................ 709/217 |
| 7,292,723 | B2 * | 11/2007 | Tedesco et al. .............. 382/159 |
| 7,302,469 | B2 * | 11/2007 | Motoyama et al. .......... 709/206 |
| 7,337,242 | B1 | 2/2008 | Motoyama et al. |
| 7,428,575 | B1 | 9/2008 | Motoyama |
| 7,533,344 | B1 | 5/2009 | Motoyama et al. |
| 7,613,802 | B2 | 11/2009 | Motoyama et al. |
| 2002/0004812 | A1 | 1/2002 | Motoyama |
| 2003/0055953 | A1 | 3/2003 | Motoyama et al. |
| 2003/0172115 | A1 | 9/2003 | Motoyama |
| 2005/0246439 | A1 | 11/2005 | Fong et al. |
| 2005/0248792 | A1 | 11/2005 | Wright |
| 2008/0184207 | A1 | 7/2008 | Motoyama et al. |

OTHER PUBLICATIONS

U.S. Appl. No. 11/960,248, filed Dec. 19, 2007, Motoyama, et al.
U.S. Appl. No. 11/833,671, filed Aug. 3, 2007, Motoyama, et al.
U.S. Appl. No. 11/742,939, filed May 1, 2007, Motoyama.
U.S. Appl. No. 11/544,560, filed Oct. 10, 2006, Motoyama, et al.
U.S. Appl. No. 11/544,564, filed Oct. 10, 2006, Motoyama, et al.
U.S. Appl. No. 11/544,562, filed Oct. 10, 2006, Motoyama, et al.
U.S. Appl. No. 11/544,688, filed Oct. 10, 2006, Motoyama, et al.
U.S. Appl. No. 11/546,983, filed Oct. 13, 2006, Motoyama, et al.
U.S. Appl. No. 11/389,262, filed Mar. 27, 2006, Motoyama.
U.S. Appl. No. 11/341,434, filed Jan. 30, 2006, Motoyama et al.
U.S. Appl. No. 11/311,248, filed Dec. 20, 2005, Motoyama.
U.S. Appl. No. 09/192,583, filed Nov. 17, 1998, Motoyama.
U.S. Appl. No. 09/311,148, filed May 13, 1999, Motoyama et al.
U.S. Appl. No. 09/393,677, filed Sep. 10, 1999, Motoyama et al.
U.S. Appl. No. 09/440,692, filed Nov. 16, 1999, Motoyama et al.
U.S. Appl. No. 09/440,646, filed Nov. 16, 1999, Motoyama et al.
U.S. Appl. No. 09/440,645, filed Nov. 16, 1999, Fong et al.
U.S. Appl. No. 11/103,436, filed Apr. 12, 2005, Fong et al.
U.S. Appl. No. 10/068,861, filed Feb. 11, 2002, Motoyama et al.
U.S. Appl. No. 10/142,986, filed May 13, 2002, Motoyama et al.
U.S. Appl. No. 11/073,635, filed Mar. 8, 2005, Motoyama.

* cited by examiner

FIG. 23

Target application #1 — map<string, string>:

| KEY | VALUE |
| --- | --- |
| UserID | RicohCorp-user1 |
| ApplicationID | MB |
| CumulativeUse | 45 |
| StartTime | 16:10:45PM Jun21,1999 |
| ⋮ | ⋮ |

Target application #2 — map<string, string>:

| KEY | VALUE |
| --- | --- |
| UserID | RicohCorp-user2 |
| ApplicationID | Diagnosis |
| CumulativeUse | 6 |
| StartTime | 16:10:45PM Jun15,1999 |
| ⋮ | ⋮ |

METHOD AND SYSTEM OF REMOTE DIAGNOSTIC, CONTROL AND INFORMATION COLLECTION USING A DYNAMIC LINKED LIBRARY

CROSS-REFERENCES TO RELATED APPLICATIONS

The present application is a continuation of U.S. application Ser. No. 09/440,693, filed Nov. 16, 1999, the entire contents of which are herein incorporated by reference. The present application is related to Ser. No. 09/440,692, filed on even date herewith, entitled "Method and System to Monitor the Application Usage and Send Back the Information Using Connection and Connectionless Mode"; Ser. No. 09/440,647, filed on even date herewith, entitled "Method and System to Monitor the Application Usage and Send Back the Information Using Connection and Connectionless Mode"; Ser. No. 09/440,646, filed on even date herewith, entitled "Method and System to Monitor the Application Usage and Send Back the Information Using Connection and Connectionless Mode"; Ser. No. 09/440,645, filed on even date herewith, entitled "Application Unit Monitoring and Reporting System and Method With Usage Data Logged Into a Map Structure"; U.S. patent application Ser. No. 09/408,443, filed Sep. 29, 1999, entitled "Method and System for Remote Diagnostic, Control, and Information Collection Based on various Communication Modes for Sending Messages to a Resource Manger"; U.S. patent application Ser. No. 09/407,769, filed Sep. 29, 1999, entitled "Method and System for Remote Diagnostic, Control and Information Collection Based on various Communication Modes for Sending Messages to Users"; U.S. patent application Ser. No. 09/393,677, filed Sep. 10, 1999, entitled "Application Unit Monitoring and Reporting System and Method"; U.S. patent application Ser. No. 09/311,148, filed May 13, 1999, entitled "Application Unit Monitoring and Reporting System and Method"; U.S. patent application Ser. No. 09/192,583, filed Nov. 17, 1998, entitled "Method and System for Communicating With a Device Attached to a Computer Using Electronic Mail Messages"; U.S. patent application Ser. No. 08/883,492, filed Jun. 26, 1997, entitled "Method and System for Diagnosis and Control of Machines Using Connectionless Modes Having Delivery Monitoring and an Alternate Communication Mode"; U.S. patent application Ser. No. 08/820,633, filed Mar. 19, 1997, entitled "Method and System to Diagnose a Business Office Device Based on Operating Parameters Set by a User," now U.S. Pat. No. 5,887,216; U.S. patent application Ser. No. 08/733,134, filed Oct. 16, 1996, entitled "Method and System for Diagnosis and Control of Machines Using Connectionless Modes of Communication"; U.S. patent application Ser. No. 08/624,228, filed Mar. 29, 1996, entitled "Method and System for Controlling and Communicating with Machines Using Multiple Communication Formats," now U.S. Pat. No. 5,818,603; U.S. patent application Ser. Nos. 08/738,659 and 08/738,461, filed Oct. 30, 1996, both of which are entitled "Method and System for Diagnosis and Control of Machines Using Connection and Connectionless Modes of Communication," which are divisions of U.S. patent application Ser. No. 08/463,002, filed Jun. 5, 1995, entitled "Method and System for Diagnosis and Control of Machines Using Connection and Connectionless Modes of Communication", now U.S. Pat. No. 5,819,110; and U.S. patent application Ser. No. 08/852,413, filed May 7, 1987, entitled "Method and System for Controlling and Communicating with Business Office Devices," now U.S. Pat. No. 5,774,678, which is a continuation of U.S. patent application Ser. No. 08/698,068, filed Aug. 15, 1996, entitled "Method and Apparatus for Controlling and Communicating With Business Office Devices", now U.S. Pat. No. 5,649,120, which is a continuation of U.S. patent application Ser. No. 08/562,192, filed Nov. 22, 1995, which is a continuation of U.S. patent application Ser. No. 08/473,780, filed Jun. 6, 1995, entitled "Method and Apparatus for Controlling and Communicating With Business Office Devices", now U.S. Pat. No. 5,544,289, which is a continuation of U.S. patent application Ser. No. 08/426,679, filed Apr. 24, 1995, entitled "Method and Apparatus for Controlling and Communicating With Business Office Devices," now U.S. Pat. No. 5,537,554, which is a continuation of U.S. patent application Ser. No. 08/282,168, filed Jul. 28, 1994, entitled "Method and Apparatus for Controlling and Communicating With Business Office Devices", now U.S. Pat. No. 5,412,779, which is a continuation of U.S. patent application Ser. No. 07/902,462, filed Jun. 19, 1992, now abandoned, which is a continuation of U.S. patent application Ser. No. 07/549,278, filed Jul. 6, 1990, now abandoned, the disclosure of each is incorporated herein by reference.

BACKGROUND OF THE INVENTION

1. Field of the Invention

This invention generally relates to a method and system that can monitor and communicate a user's usage of interfaces of plural target applications of an application unit by using at least one Dynamic Linked Library (DLL) shared between the plural target applications.

2. Discussion of the Background

With the rise of computer usage, software development has clearly become a significant business. In evaluating software, it may be beneficial to monitor exactly how a user utilizes a software application. As an example, it may be helpful for a software developer to know which commands a user uses most often and how long those commands take to execute. Such an analysis is often referred to as "profiling." (Analogous analysis was performed on instructions in instruction sets to develop reduced instruction set computing (RISC) instructions.)

Further, in designing devices with which a human interacts, it may be desirable to monitor how the user interacts with such a device. As an example, it may be desirable to monitor how a user utilizes a control panel of an image forming device such as a photocopier, facsimile machine, printer, scanner, an appliance such as a microwave oven, VCR, digital camera, cellular phone, palm top computer, etc.

Further, users are increasingly utilizing the Internet. There is significant interest in how users use the Internet, particularly with respect to how users may use certain web pages. Monitoring a user's usage of the Internet may also become significant.

It may also be desirable to determine how a user is utilizing a certain application unit (e.g., a computer running a software application, a device with an interface to be operated by a user, or a web page). The user's usage of the application unit must be monitored and effectively communicated to a remote party.

SUMMARY OF THE INVENTION

One object of the present invention is to provide a novel and effective system for monitoring a user's usage of an interface of a target application of an application unit.

A further object of the present invention is to provide a novel system for communicating data obtained by monitoring a user's usage of an interface of a target application of an application unit to a remote party.

A further object of the present invention is to efficiently communicate the monitored usage information to a transmission unit.

The present invention achieves these and other objects by monitoring the usage of a user interface of a target application of an application unit. Monitoring examples include (1) monitoring a software program being executed on a computer or workstation under control of a user, (2) monitoring usage of a control panel of an image forming apparatus (e.g., a copying machine, printer, facsimile, or scanner), an appliance (e.g., a microwave oven, VCR, digital camera, cellular phone, or palm top computer), and (3) monitoring any other device or system that has a user interface. The data obtained by monitoring a user's usage of a target application of an application unit can, as a further feature in the present invention, be collected, logged and communicated to a desired location by Internet e-mail. The use of e-mail communication reduces the costs associated with communicating such data. The data can be communicated to the desired location at several instances. Such instances include each time a user exits a target application of an application unit, or after a predetermined number of times that a user has utilized and exited the target application of the application unit. If the configuration allows and if necessary, the direct connection between the monitored application and the monitoring system can be established in addition to the e-mail communication.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 23 shows specific examples of data which can be stored in the first map structure of FIG. 22 in the present invention;

DESCRIPTION OF THE PREFERRED EMBODIMENTS

Figure 1:
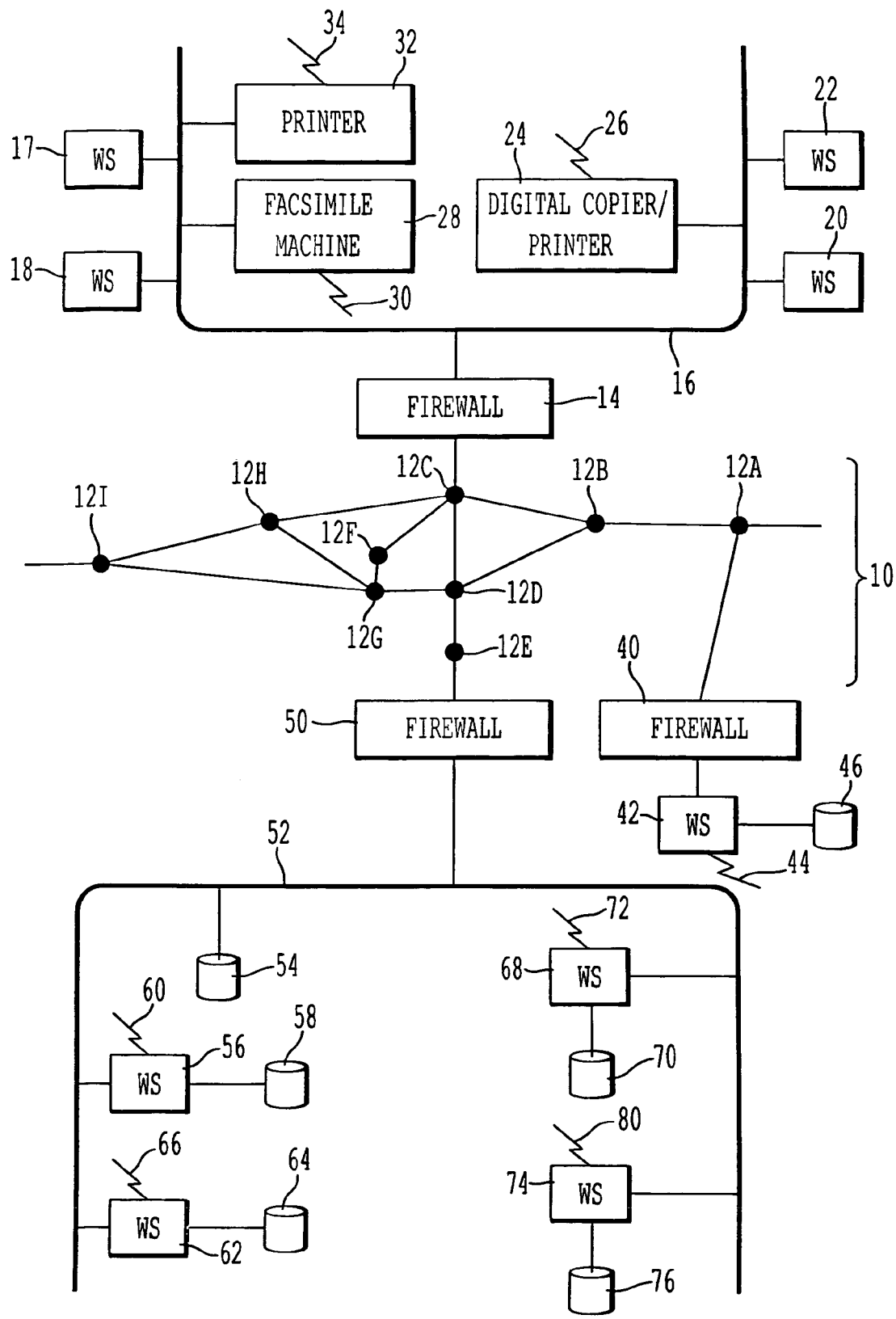
FIG. 1 illustrates three networked business office machines connected to a network of computers and databases through the Internet.

Referring now to the drawings, wherein like reference numerals designate identical or corresponding parts throughout the several views, FIG. 1 illustrates (1) various machines and (2) computers for monitoring, diagnosing and controlling the operation of the machines. In FIG. 1, there is a first network 16, such as a Local Area Network (LAN) connected to computer workstations 17, 18, 20 and 22. The workstations can be any type of computers including IBM Personal Computer compatible devices, Unix-based computers, or Apple Macintoshes. Also connected to the network 16 are (1) a digital image forming apparatus 24, (2) a facsimile machine 28, and (3) a printer 32. As would be appreciated by one of ordinary skill in the art, two or more of the components of the digital image forming apparatus 24 and the facsimile machine 28 can be combined into a unified "image forming apparatus." The devices 24, 28 and 32 and the workstations 17, 18, 20 and 22 are referred to as machines or monitored devices and other types of devices may be used as the machines or monitored devices, including any of the devices discussed below. Also, a facsimile server (not illustrated) may be connected to the network 16 and have a telephone, ISDN (Integrated Services Digital Network), cable or wireless connection. In addition to the digital image forming apparatus 24, facsimile machine 28, and printer 32 being connected to the network 16, these devices may also include conventional telephone and/or ISDN and/or cable and/or wireless connections 26, 30 and 34, respectively. As is explained below, the business office machines or business devices 24, 28 and 32 communicate with a remote monitoring, diagnosis and control station, also referred to as a monitoring device, through the Internet via the network 16 or by a direct telephone, ISDN, wireless, or cable connection.

In FIG. 1, a wide area network (WAN) (e.g., the Internet or its successor) is generally designated by 10. The WAN 10 can either be a private WAN or a public WAN. The WAN 10 includes a plurality of interconnected computers and routers designated by 12A-12I. The manner of communicating over a WAN is known through RFC documents obtained by HTTP://www.ietf.org/rfc.html. TCP/IP related communication is described for example in the book "TCP/IP Illustrated," Vol. 1, The Protocols, by Stevens, from Addison-Wesley Publishing Company, 1994, which is incorporated herein by reference. Volumes 1-3 of "Internetworking with TCP/IP" by Comer and Stevens are also incorporated herein by reference in their entirety.

In FIG. 1, a firewall 14 is connected between the WAN 10 and the network 16. A firewall is a device that allows only authorized computers on one side of the firewall to access a network or other computers on the other side of the firewall. Firewalls are known and commercially available devices and/or software and, for example, include SunScreen from Sun Microsystems Inc. Similarly, a firewall 50 is connected between the WAN 10 and a network 52. Also, a firewall 40 is connected between the WAN 10 and a workstation 42.

The network 52 is a conventional network and includes a plurality of workstations 56, 62, 68 and 74. These workstations may be in different departments (e.g., marketing, manufacturing, design engineering and customer service departments) within a single company. In addition to the workstations connected via the network 52, there is a workstation 42 which is not directly connected to the network 52. Information in a database stored in a disk 46 may be shared using proper encryption and protocols over the WAN 10 to the workstations connected directly to the network 52. Also, the workstation 42 includes a direct connection to a telephone line and/or ISDN and/or cable and/or wireless network 44 and the database in disk 46 may be accessed through the telephone line, ISDN, cable or wirelessly. The cable used by this invention may be implemented using a cable which typically is used to carry television programming, a cable which provides for high speed communication of digital data typically used with computers or the like, or any other desired type of cable.

Information of the business office machines 24, 28 and 32 may be stored in one or more of the databases stored in the disks 46, 54, 58, 64, 70 and 76. Known databases include (1) SQL databases by Microsoft, Oracle and Sybase (2) other relational databases, and (3) non-relational databases (including object oriented databases). Each of the customer service, marketing, manufacturing, and engineering departments may have their own database or may share one or more databases. Each of the disks used to store databases is a non-volatile memory such as a hard disk or optical disk. Alternatively, the databases may be stored in any storage device including solid state and/or semiconductor memory devices. As an example, disk 64 contains the marketing database, disk 58 contains the manufacturing database, disk 70 contains the engineering database and disk 76 contains the customer service database. Alternatively, the disks 54 and 46 store one or more of the databases.

In addition to the workstations 56, 62, 68, 74 and 42 being connected to the WAN, these workstations may also include a connection to a telephone line, ISDN, cable, or wireless network which provides a secure connection to the machine being monitored, diagnosed and/or controlled and is used during communication. Additionally, if one communication medium is not operating properly, one of the others can be automatically used for communication.

A feature of the present invention is the use of a "store-and-forward" mode of communication (e.g., Internet e-mail) or transmission between a machine and a computer for diagnosing and controlling the machine. Alternatively, the e-mail which is transmitted may be implemented using a mode of communication that makes direct, end-to-end connections.

Figure 2:
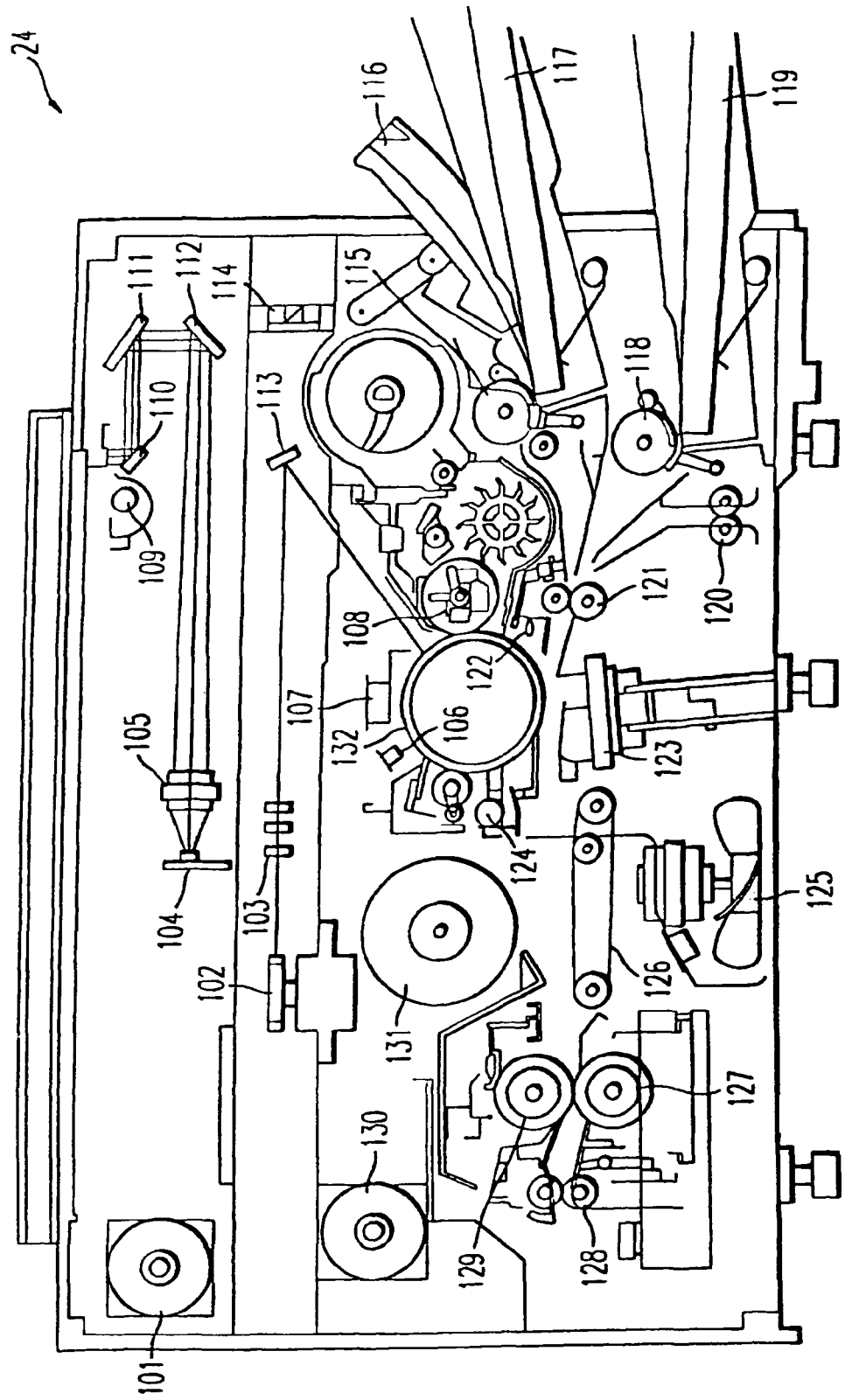
FIG. 2 illustrates the components of a digital image forming apparatus.

FIG. 2 illustrates the mechanical layout of the digital image forming apparatus 24 illustrated in FIG. 1. In FIG. 2, 101 is a fan for the scanner, 102 is a polygonal mirror used with a laser printer, and 103 designates an F lens used to collimate light from a laser (not illustrated). Reference numeral 104 designates a sensor for detecting light from the scanner. 105 is a lens for focusing light from the scanner onto the sensor 104, and 106 is a quenching lamp used to erase images on the photoconductive drum 132. There is a charging corona unit 107 and a developing roller 108. Reference numeral 109 designates a lamp used to illustrate a document to be scanned and 110, 111 and 112 designate mirrors used to reflect light onto the sensor 104. There is a drum mirror 113 used to reflect light to the photoconductive drum 132 originating from the polygon mirror 102. Reference numeral 114 designates a fan used to cool the charging area of the digital image forming apparatus, and 115 is a first paper feed roller used for feeding paper from the first paper cassette 117, and 116 is a manual feed table. Similarly, 118 is a second paper feed roller for the second cassette 119. Reference numeral 120 designates a relay roller, 121 is a registration roller. 122 is an image density sensor and 123 is a transfer/separation corona unit. Reference numeral 124 is a cleaning unit, 125 is a vacuum fan, 126 illustrates a transport belt, 127 is a pressure roller, and 128 is an exit roller. Reference numeral 129 is a hot roller used to fix toner onto the paper, 130 is an exhaust fan and 131 is the main motor used to drive the digital copier.

Figure 3:
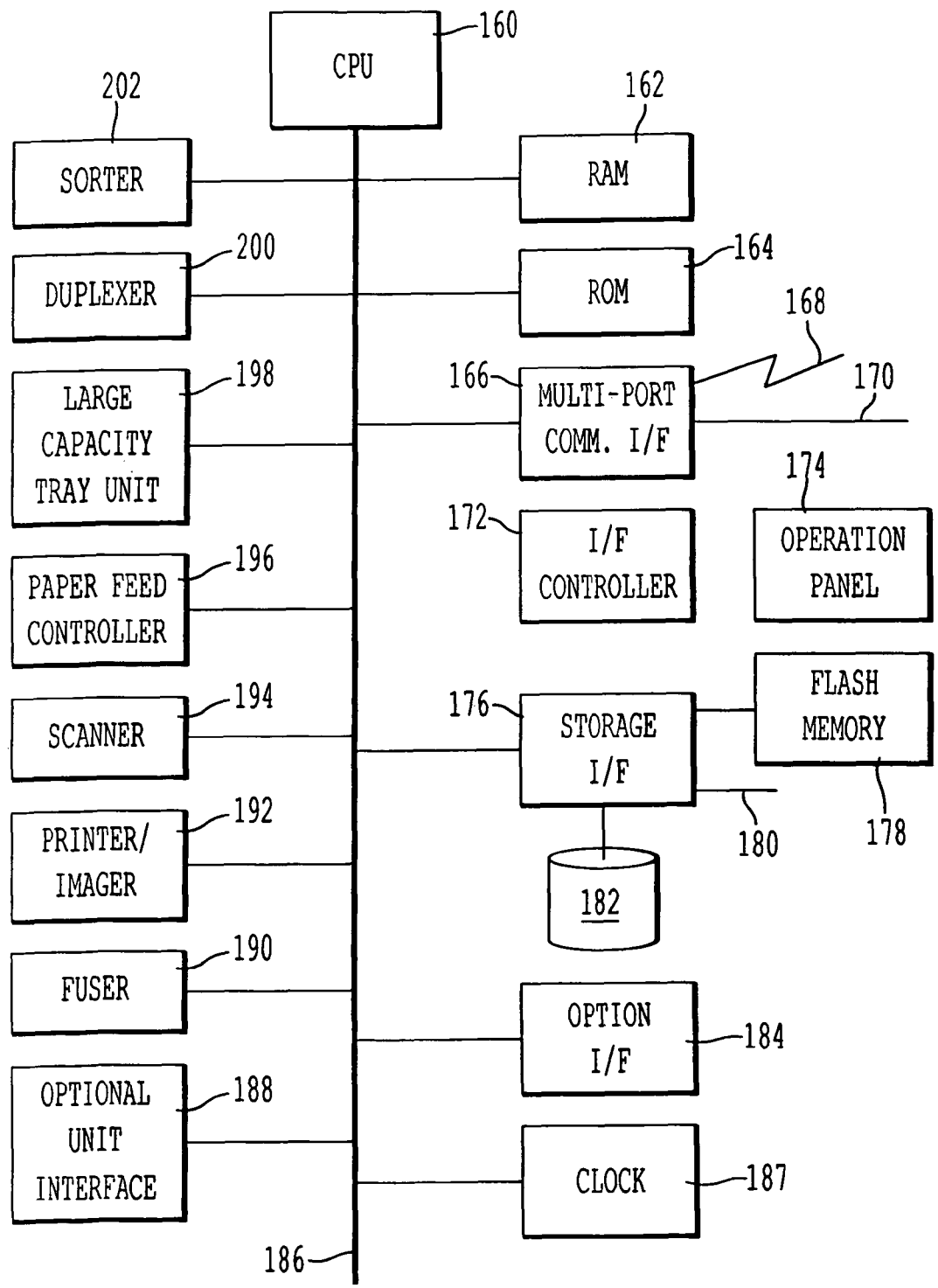
FIG. 3 illustrates the electronic components of the digital image forming apparatus illustrated in FIG. 2.

FIG. 3 illustrates a block diagram of the electronic components illustrated in FIG. 2. The CPU 160 is a microprocessor and acts as the system controller. Random access memory (RAM) 162 stores dynamically changing information including operating parameters of the digital copier. A non-volatile memory (e.g., a read only memory (ROM) 164) stores the program code used to run the digital copier and also information describing the copier (static-state data) such as the model number, serial number of the copier, and default parameters.

There is a multi-port communication interface 166 which allows the digital copier to communicate with external devices. Reference number 168 represents a telephone, ISDN, or cable line and 170 represents a network. Further information of the multi-port communication interface is described with respect to FIG. 4. An interface controller 172 is used to connect an operation panel 174 to a system bus 186. The operation panel 174 includes standard input and output devices found on a digital copier including a copy button, keys to control the operation of the copier such as number of copies, reducement/enlargement, darkness/lightness, etc. Additionally, a liquid crystal display may be included within the operation panel 174 to display parameters and messages of the digital copier to a user.

A storage interface 176 connects storage devices to the system bus 186. The storage devices include a flash memory 178 which can be substituted by a conventional EEPROM and a disk 182. The disk 182 includes a hard disk, optical disk, and/or a floppy disk drive. There is a connection 180 connected to the storage interface 176 which allows for additional memory devices to be connected to the digital copier. The flash memory 178 is used to store semi-static state data which describes parameters of the digital copier which infrequently change over the life of the copier. Such parameters include the options and configuration of the digital copier. An option interface 184 allows additional hardware such as an external interface to be connected to the digital copier. A clock/timer 187 is utilized to keep track of both the time and date and also to measure elapsed time.

On the left side of FIG. 3, the various sections making up the digital copier are illustrated. Reference numeral 202 designates a sorter and contains sensors and actuators used to sort the output of the digital copier. There is a duplexer 200 which allows a duplex operation to be performed by the digital copier and includes conventional sensors and actuators. The digital copier includes a large capacity tray unit 198 which allows paper trays holding a large number of sheets to be used with the digital copier. The large capacity tray unit 198 includes conventional sensors and actuators.

A paper feed controller 196 is used to control the operation of feeding paper into and through the digital copier. A scanner 194 is used to scan images into the digital copier and includes conventional scanning elements such as a light, mirror, etc. Additionally, scanner sensors are used such as a home position sensor to determine that the scanner is in the home position, and a lamp thermistor is used to ensure proper operation of the scanning lamp. There is a printer/imager 192 which prints the output of the digital copier and includes a conventional laser printing mechanism, a toner sensor, and an image density sensor. The fuser 190 is used to fuse the toner onto the page using a high temperature roller and includes an exit sensor, a thermistor to assure that the fuser 190 is not overheating, and an oil sensor. Additionally, there is an optional unit interface 188 used to connect to optional elements of the digital copier such as an automatic document feeder, a different type of sorter/collator, or other elements which can be added to the digital copier.

Figure 4:
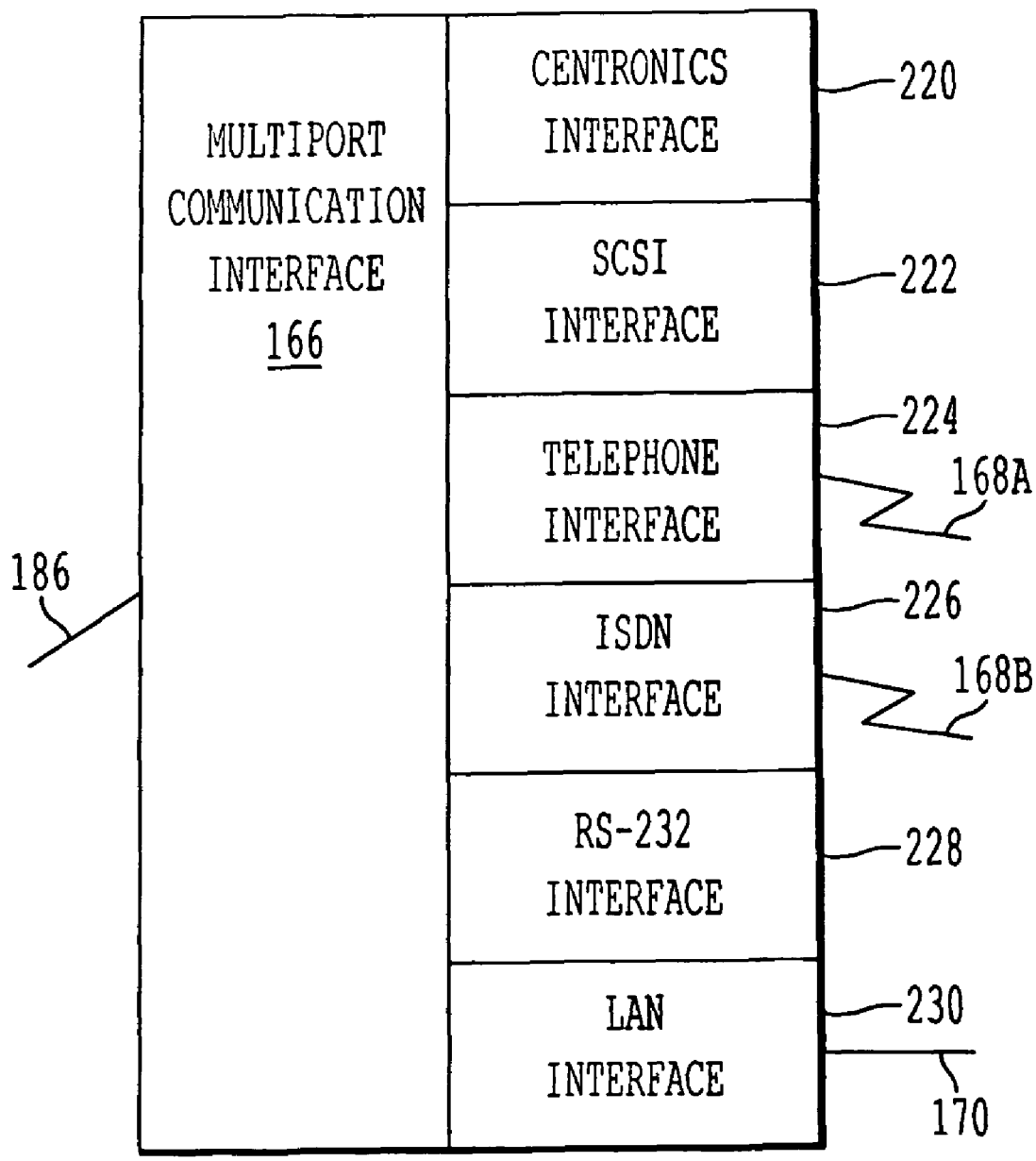
FIG. 4 illustrates details of the multi-port communication interface illustrated in FIG. 3.

FIG. 4 illustrates details of the multi-port communication interface 166. The digital copier may communicate to external devices through a Centronics interface 220 which receives or transmits information to be printed, a cable modem unit 221 which has a high speed connection over cable, a SCSI interface 222, a conventional telephone interface 224 which connects to a telephone line 168A, an ISDN interface 226 which connects to an ISDN line 168B, an RS-232 interface 228, and a LAN interface 230 which connects to a LAN 170. Other interfaces (not shown) include, but are not limited to, Firewire and Digital Subscriber Line (DSL) (original DSL, concentric DSL, and asymmetric DSL). FireWire (IEEE 1394) is described in Wickelgren, I., "The Facts About "FireWire", IEEE Spectrum, April 1997, Vol. 34, Number 4, pp. 19-25, the contents of which are incorporated herein by reference. Preferably, communication utilizes a "reliable" protocol with error detection and retransmission. Examples of such a protocol include Reliable Datagram Protocol (RDP) and Transmission Control Protocol (TCP). A single device which connects to both a Local Area Network and a telephone line is commercially available from Megahertz and is known as the Ethernet-Modem.

The CPU or other microprocessor or circuitry executes a monitoring process to monitor the state of each of the sensors of the digital copier, and a sequencing process is used to execute the instructions of the code used to control and operate the digital copier. Additionally, there is a central system control process executed to control the overall operation of the digital copier and a communication process used to assure reliable communication to external devices connected to the digital copier. The system control process monitors and controls data storage in a static state memory such as the ROM 164 of FIG. 3, a semi-static memory such as the flash memory 178 or disk 182, or the dynamic state data which is stored in a volatile or non-volatile memory such as the RAM 162 or the flash memory 178 or disk 182. Additionally, the static state data may be stored in a device other than the ROM 164 such as a non-volatile memory including either of the flash memory 178 or disk 182.

The above details have been described with respect to a digital copier but the present invention is equally applicable to other business office machines or devices such as an analog copier, a facsimile machine, a scanner, a printer, a facsimile server, or other business office machines, or appliances with which a user interface (e.g., a microwave oven, VCR, digital camera, cellular phone, palm top computer). Additionally, the present invention includes other types of devices which operate using store-and-forward or direction connection-based communication. Such devices include metering systems (including gas, water, or electricity metering systems), vending machines, or any other mechanical device (e.g., automobiles) that need to be monitored during operation or remote diagnosis. In addition to monitoring special purpose machines and computers, the invention can be used to monitor, control, and diagnose a general purpose computer which would be the monitored and/or controlled device.

Figure 5:
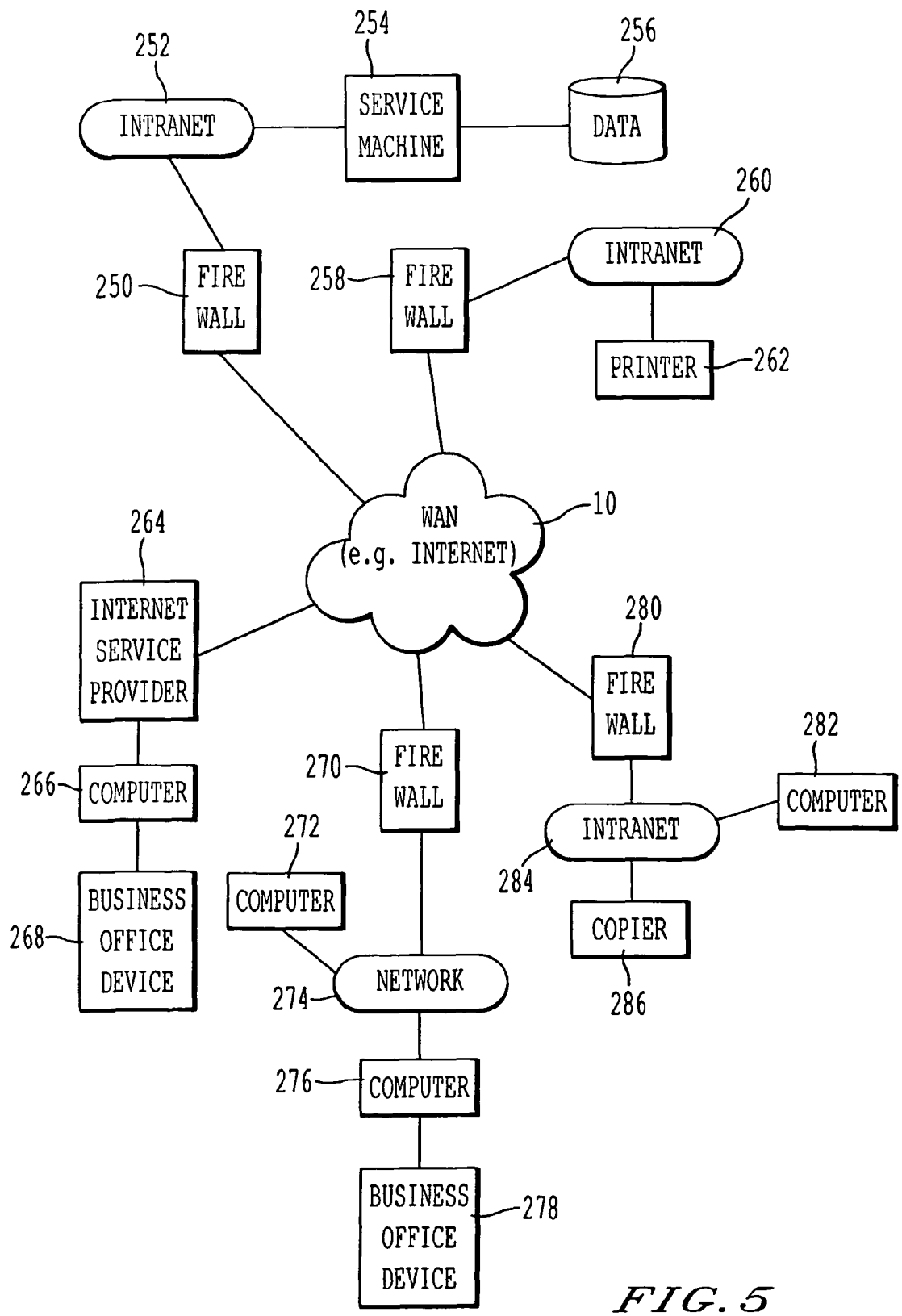
FIG. 5 illustrates an alternative system configuration in which business office devices are either connected directly to the network or connected to a computer which is connected to the network.

FIG. 5 illustrates an alternative system diagram of the invention in which different devices and subsystems are connected to the WAN 10. However, there is no requirement to have each of these devices or subsystems as part of the invention. Each component or subsystem illustrated in FIG. 5 is individually part of the invention. Further, the elements illustrated in FIG. 1 may be connected to the WAN 10 which is illustrated in FIG. 5. In FIG. 5, there is illustrated a firewall 250 connected to an intranet 252. The service machine 254 connected to the intranet 252 includes therein or has connected thereto data 256 which may be stored in a database format. The data 256 includes history, performance, malfunction, and any other information including statistical information of the operation or failure or set-up and components or optional equipment of devices which are being monitored. The service machine 254 may be implemented as the device or computer which requests the monitored devices to transmit data or which requests that remote control and/or diagnostic tests be performed on the monitored devices. The service machine 254 may be implemented as any type of device and is preferably implemented using a computerized device such as a general purpose computer.

Another sub-system of FIG. 5 includes a firewall 258, an intranet 260, and a printer 262 connected thereto. In this sub-system, the functions of sending and receiving electronic mail messages by the printer 262 (and similarly by a copier 286) are performed by circuitry, a microprocessor, or any other type of hardware contained within or mounted to the printer 262 (i.e., without using a separate general purpose computer).

An alternate type of sub-system includes the use of an Internet service provider 264 which may be any type of Internet service provider (ISP), including known commercial companies such as America Online, Netcom, CompuServe, Niftyserve, the Internet service provider Erols. In this subsystem, a computer 266 is connected to the ISP 264 through a modem, for example, such as a telephone line modem, a cable modem, modems which use any type of wires such as modems used over an ISDN (Integrated Services Digital Network) line, ASDL (Asymmetric Digital Subscriber Line), modems which use frame relay communication, any digital or analog modem, wireless modems such as a radio frequency modem, a fiber optic modem, or a device which uses infrared light waves. Further, a business office device 268 is connected to the computer 266. As an alternative to the business office device 268 (and any other device illustrated in FIG. 5), a different type of machine may be monitored or controlled such as a digital copier, any type of appliance, security system, or utility meter such as an electrical, water, or gas utility meter, or any other device discussed herein.

Also illustrated in FIG. 5 is a firewall 270 connected to a network 274. The network 274 may be implemented as any type of computer network, (e.g., an Ethernet or token-ring network). Networking software which may be used to control the network includes any desired networking software including software commercially available from Novell or Microsoft. The network 274 may be implemented as an Intranet, if desired. A computer 272 connected to the network 274 may be used to obtain information from a business office device 278 and generate reports such as reports showing problems which occurred in various machines connected to the network and a monthly usage report of the devices connected to the network 274. In this embodiment, a computer 276 is connected between the business office device 278 and the network 274. This computer receives e-mail communications from the network and forwards the appropriate commands or data, or any other information, to the business office device 278. Communication between the business office device 278 and the computer 276 may be accomplished using wire-based or wireless methods including, but not limited to radio frequency connections, electrical connections and light connections (e.g., an infrared connection, or a fiber optics connection). Similarly, each of the various networks and intranets illustrated in FIG. 5 may be established using any desired manner including through the establishment of wireless networks such as radio frequency networks. The wireless communication described herein may be established using spread spectrum techniques including techniques which use a spreading code and frequency hopping techniques such as the frequency hopping wireless technique which is disclosed in the Bluetooth Specification (available at the world wide web site www.bluetooth.com), which is incorporated herein by reference.

Another sub-system illustrated in FIG. 5 includes a firewall 280, an intranet 284, a computer 282 connected thereto, and a copier 286. The computer 282 may be used to generate reports and request diagnostic or control procedures. These diagnostic and control procedures may be performed with respect to the copier 286 or any of the other devices illustrated in or used with FIG. 5. While FIG. 5 illustrates a plurality of firewalls, the firewalls are preferable but optional equipment and therefore the invention may be operated without the use of firewalls, if desired.

Figure 6A:
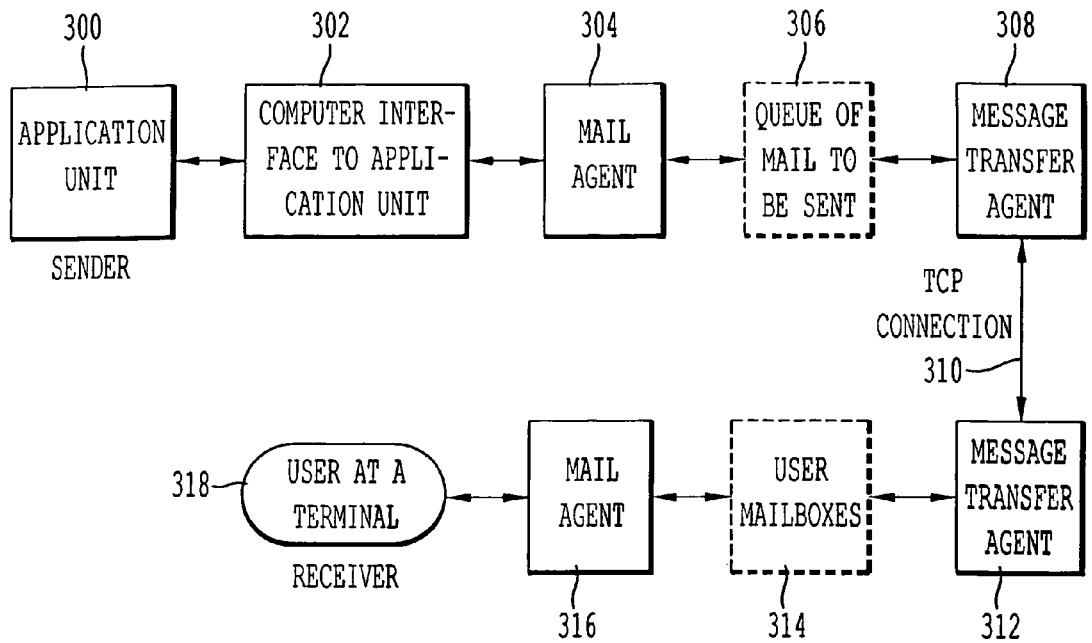
FIG. 6A illustrates in block diagram format the flow of information to and from an application unit using electronic mail.

FIG. 6A illustrates an application unit 300 connected to a typical e-mail exchange system which includes components 302, 304, 306, 308, 310, 312, 314, 316, and 318 which may be implemented in a conventional manner and are taken from FIG. 28.1 of Stevens, above. A computer 302 interfaces with any of the application units 300 described herein. While FIG. 6A illustrates that the application unit 300 is the sender, the sending and receiving functions may be reversed in FIG. 6A. Furthermore, if desired, the user may not be needed to interface with the application unit 300 at all. The computer interface 302 then interacts with a mail agent 304. Popular mail agents for Unix include MH, Berkeley Mail, Elm, and Mush. Mail agents for the Windows family of operating systems include Microsoft Outlook and Microsoft Outlook Express. At the request of the computer interface 302, the mail agent 304 creates e-mail messages to be sent and, if desired, places these messages to be sent in a queue 306. The mail to be sent is forwarded to a Message Transfer Agent (MTA) 308. A common MTA for Unix systems is Sendmail. Typically, the message transfer agents 308 and 312 exchange communications using a TCP (Transfer Control Protocol) connection or a TCP/IP (Internet Protocol) connection. Notably, the communication between the message transfer agents 308 and 312 may occur over any size network (e.g., WAN or LAN). Further, the message transfer agents 308 and 312 may utilize any communication protocol. In the present invention, steps 302 and 304 reside in the library to monitor the application unit's usage.

From the message transfer agents 312, e-mail messages are stored in user mailboxes 314 which are transferred to the mail agent 316 and ultimately transmitted to the user at a terminal 318 which functions as a receiving terminal.

This "store-and-forward" process avoids the sending mail agent 304 from having to wait until establishment of the direct connection with the mail. Because of network delays, the communication could take a substantial amount of time during which the application would be unresponsive. Such an unresponsiveness is generally unacceptable to users of the application unit. By using e-mail as the store-and-forward process, retransmission attempts after failures occur automatically for a fixed period of time (e.g., three days). In an alternate embodiment, the application controlling the user interface can avoid waiting by passing communicating requests to one or more separate threads. Those threads can then control communication with the receiving terminal 318 while the application begins responding to the user interface again. In yet another embodiment in which a user wishes to have communication completed before continuing, direct communication with the receiving terminal is used. Such directed communication can utilize any protocol not blocked by a firewall between the sending and receiving terminals. Examples of such protocols include SMTP, HTTP, gopher, FTP, and NNTP.

Public WANs, such as the Internet, is not considered to be secure. Therefore, messages transmitted over the public WANs (and multi-company private WANs) should be encrypted to keep the messages confidential. Encryption mechanisms are known and commercially available which may be used with the present invention. For example, a C library function, crypto, is available from Sun Microsystems for use with the Unix operating system. Other encryption and decryption software packages are known and commercially available and may also be used with this invention. One such package is PGP Virtual Private Network (VPN) available from Network Associates. Other VPN software is available from Microsoft Corporation.

Figure 6B:
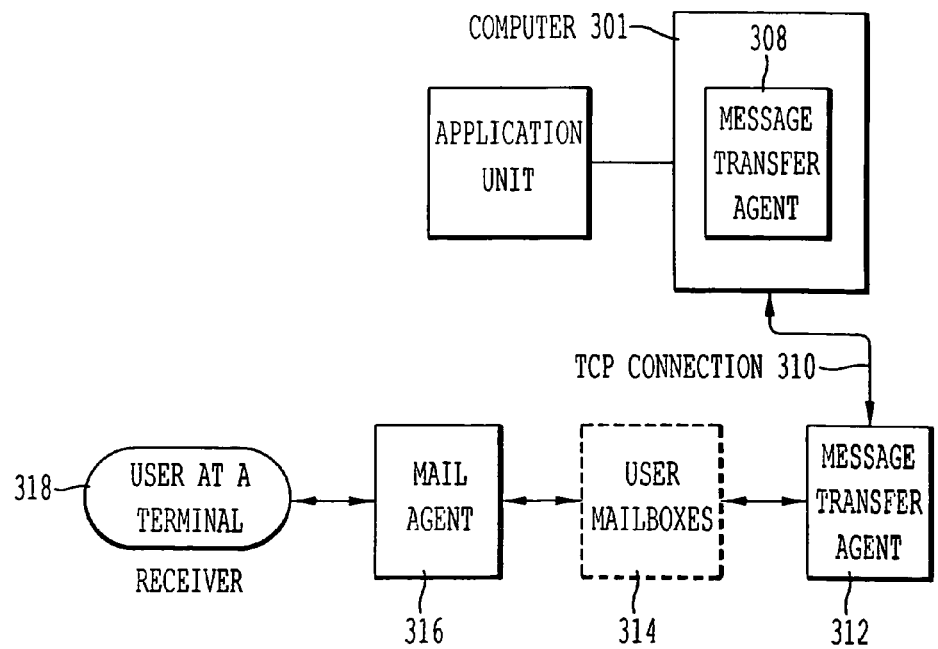
FIG. 6B illustrates an alternative way of communicating using electronic mail in which the computer which is connected to the application unit also serves as a message transfer agent.

As an alternative to the general structure of FIG. 6A, a single computer may be used which functions as the computer interface 302, the mail agent 304, the mail queue 306 and the message transfer agent 308. As illustrated in FIG. 6B, the application unit 300 is connected to a computer 301 which includes the message transfer agent 308.

Figure 6C:
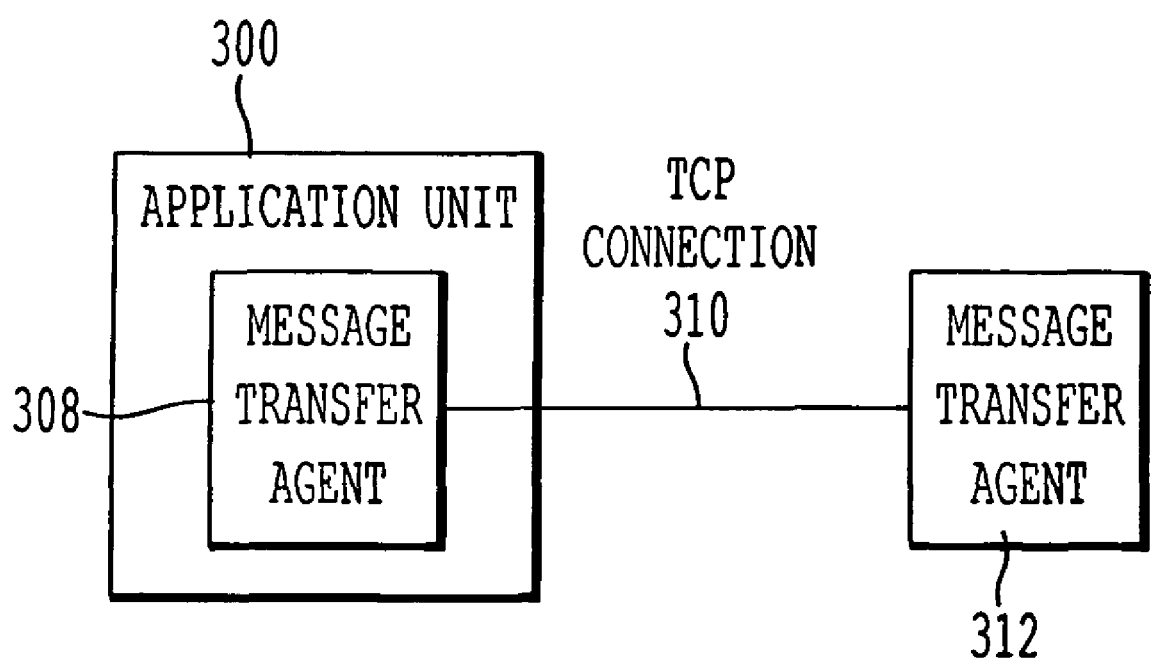
FIG. 6C illustrates an alternative way of communicating using electronic mail in which an application unit includes a message transfer agent for exchanging electronic mail.

A further alternative structure is shown in FIG. 6C in which the message transfer agent 308 is formed as part of the application unit 300. Further, the message transfer agent 308 is connected to the message transfer agent 312 by a TCP connection 310. In the embodiment of FIG. 6C, the application unit 300 is directly connected to the TCP connection 310 and has an e-mail capability. One use of the embodiment of FIG. 6C includes using a facsimile machine with an e-mail capability (defined in RFC 2305 (a simple mode of facsimile using Internet mail)) as the application unit 300.

Figure 7:
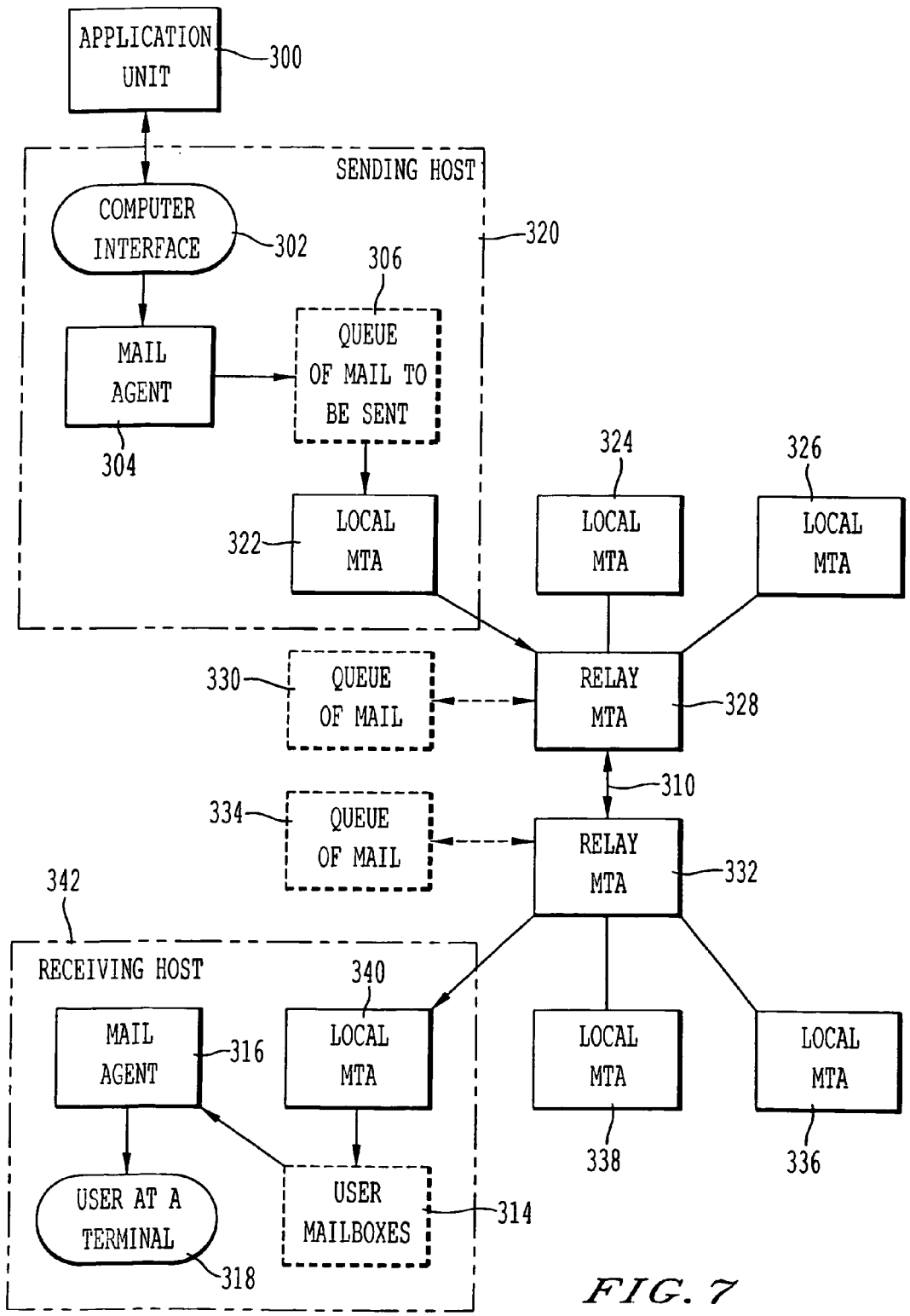
FIG. 7 illustrates an alternative manner of sending messages across the Internet.

FIG. 7 illustrates an alternative implementation of transferring mail and is based on FIG. 28.3 of Stevens. FIG. 7 illustrates an electronic mail system having a relay system at each end. The arrangement of FIG. 7 allows one system at an organization to act as a mail hub. In FIG. 7, there are four MTAs connected between the two mail agents 304 and 316. These MTAs include local MTA 322, relay MTA 328, relay MTA 332, and local MTA 340. The most common protocol used for mail messages is SMTP (Simple Mail Transfer Protocol) which may be used with this invention, although any desired mail protocol may be utilized. In FIG. 7, 320 designates a sending host which includes the computer interface 302, the mail agent 304, and the local MTA 322. The application unit 300 is connected to, or alternatively included within, the sending host 320. As another case, the application unit 300 and host 320 can be in one machine where the host capability is built into the application unit 300. Other local MTAs include local MTA 324 and 326. Mail to be transmitted and received may be queued in a queue of mail 330 of the relay MTA 328. The messages are transferred across the TCP connection 310, which may be, for example, the Internet, or may be any other type of network or connection.

The transmitted messages are received by the relay MTA 332 and if desired, stored in a queue of mail 334. The mail is then forwarded to the local MTA 340 of a receiving host 342. The mail may be placed in one or more of the user mailboxes 314 and subsequently forwarded to the mail agent 316 and finally forwarded to the user at a terminal 318. If desired, the mail may be directly forwarded to the terminal without user interaction. Other local MTAs at the receiving side include MTA 338 and local MTA 336 which may have their own mailboxes, mail agents, and terminals.

Figure 8:
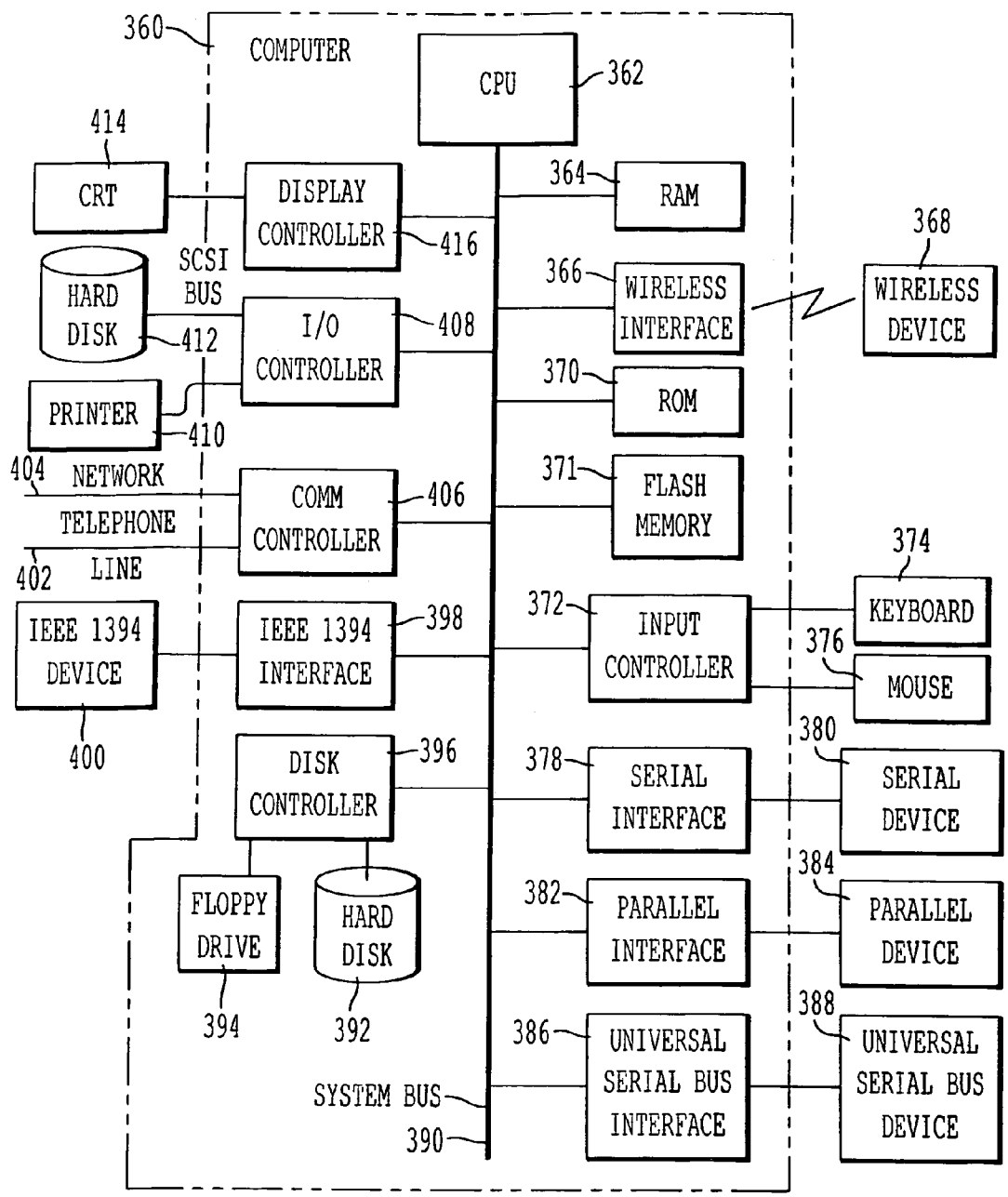
FIG. 8 illustrates an exemplary computer which may be connected to the device and used to communicate electronic mail messages.

The various computers utilized by the present invention, including the computers 266 and 276 of FIG. 5, may be implemented as illustrated in FIG. 8. Further, any other computer utilized by this invention may be implemented in a similar manner to the computer illustrated in FIG. 8, if desired, including the service machine 254, computer 272, and computer 282 of FIG. 5. However, not every element illustrated in FIG. 8 is required in each of those computers. In FIG. 8, the computer 360 includes a CPU 362 which may be implemented as any type of processor including commercially available microprocessors from companies such as Intel, AMD, Motorola, Hitachi and NEC. There is a working memory such as a RAM 364, and a wireless interface 366 which communicates with a wireless device 368. The communication between the interface 366 and device 368 may use any wireless medium (e.g., radio waves or light waves). The radio waves may be implemented using a spread spectrum technique such as Code Division Multiple Access (CDA) communication or using a frequency hopping technique such as that disclosed in the Bluetooth specification.

There is a ROM 370 and a flash memory 371, although any other type of non-volatile memory may be utilized in addition to or in place of the flash memory 371 such as an EPROM, or an EEPROM, for example. An input controller 372 has connected thereto a keyboard 374 and a mouse 376. There is a serial interface 378 connected to a serial device 380. Additionally, a parallel interface 382 is connected to a parallel device 384, a universal serial bus interface 386 is connected to a universal serial bus device 388, and also there is an IEEE 1394 device 400, commonly referred to as a fire wire device, connected to an IEEE 1394 interface 398. The various elements of the computer 360 are connected by a system bus 390. A disk controller 396 is connected to a floppy disk drive 394 and a hard disk drive 392. A communication controller 406 allows the computer 360 to communicate with other computers (e.g., by sending e-mail messages) over a telephone line 402 or a network 404. An I/O (Input/Output) controller 408 is connected to a printer 410 and a hard disk 412, for example using a SCSI (Small Computer System Interface) bus. There is also a display controller 416 connected to a CRT (Cathode Ray Tube) 414, although any other type of display may be used including a liquid crystal display, a light emitting diode display, a plasma display, etc.

One feature in the present invention is to monitor how a user uses a target application of an application unit. The term application unit in this instance refers to a system which a user interacts with and controls. A "target application" refers to a user controlled system that controls the application unit. For example, an application unit may typically be a computer and a target application may then be a software program, e.g. a word processor, running on the computer which a user operates, for example by moving a pointer on a computer screen and "clicking" on certain command icons to cause the software program to perform certain functions. In this sense, an application unit in the present invention can refer to any of workstations 17, 18, 20, 22, 56, 62, 68, 74, 42 shown in FIG. 1 running a software program, the computer 301 shown in FIG. 6B running a software program, etc. An application unit can also refer to an image forming device such as any of the digital image forming apparatus 24, facsimile machine 28, and printer 32 in FIGS. 1 and 2. In this instance, each of these device application units includes a user interface, such as operation panel 174 (see FIG. 3), which a user interacts with and utilizes to control the device application unit. The present invention can monitor a user selecting controls on such an operation panel. As a further example, the application unit could also be an appliance, such as a microwave oven, with an operation panel. An application unit can also refer to any other device, including software, with which a user interacts, and in this case the target application may refer to only one feature of the software which the user interacts with.

One feature of the present invention is to monitor the user's usage of such a target application of an application unit, and to effectively communicate data of the monitored usage. This data will typically be transmitted by e-mail by the computer interface 302 of FIG. 6A, or the computer of FIG. 6B or the application unit 300 of FIG. 6C. This data of a user's usage of a target application of an application unit can then be utilized in many ways, for example in improving software development, in monitoring usage of a device (e.g., an image forming device), discovering user difficulties with appliances and software, and finding most frequently used features of application units.

Figure 9:
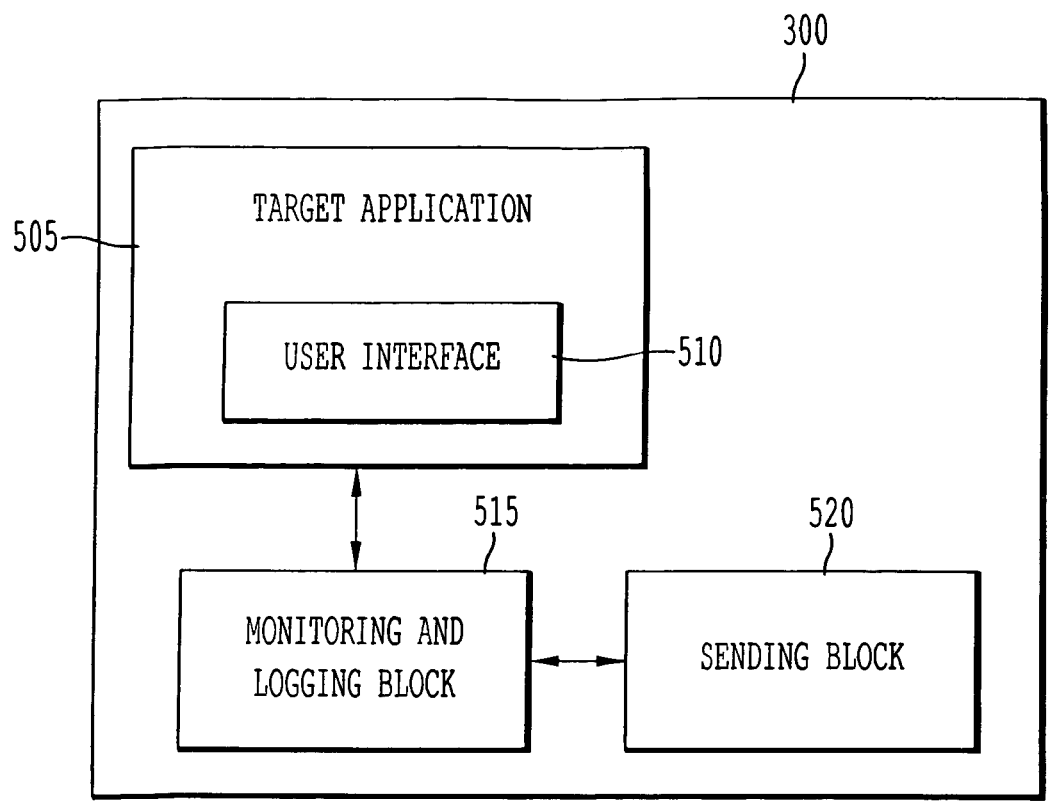
FIG. 9 shows in block diagram format connections between a monitoring and logging subsystem, a communications subsystem and a target application of an application unit in the present invention.

FIG. 9 shows various elements of the present invention. More particularly, FIG. 9 shows an application unit 300 including a target application 505 which includes a user interface 510. This user interface 510 is an interface for a user to control the application unit 500 (via the target application 505). As discussed above, in one common instance, the target application 505 may be a software program running on one of the workstations 17, 18, 20, 22 shown for example in FIG. 1 of the present specification. In this instance, the user interface 510 may be a display on a monitor of one of these workstations. One embodiment of such a target application is shown in further detail in FIG. 10 which shows a monitor 600 of one of the workstations 17, 18, 20, and 22. In that embodiment of a target application, a plurality of function keys 605 are displayed on the monitor 600 and the user accesses those function keys by, for example, changing the positioning of a pointer with a mouse and "clicking" on one of such function keys. As a further example, if monitor 600 is a touch pad, the user controls the software application unit by touching one of the function keys 605. In those instances, the present invention monitors each time a user "clicks" on or touches one of the function keys 605, and logs the usage data for subsequent communication.

Figure 11:
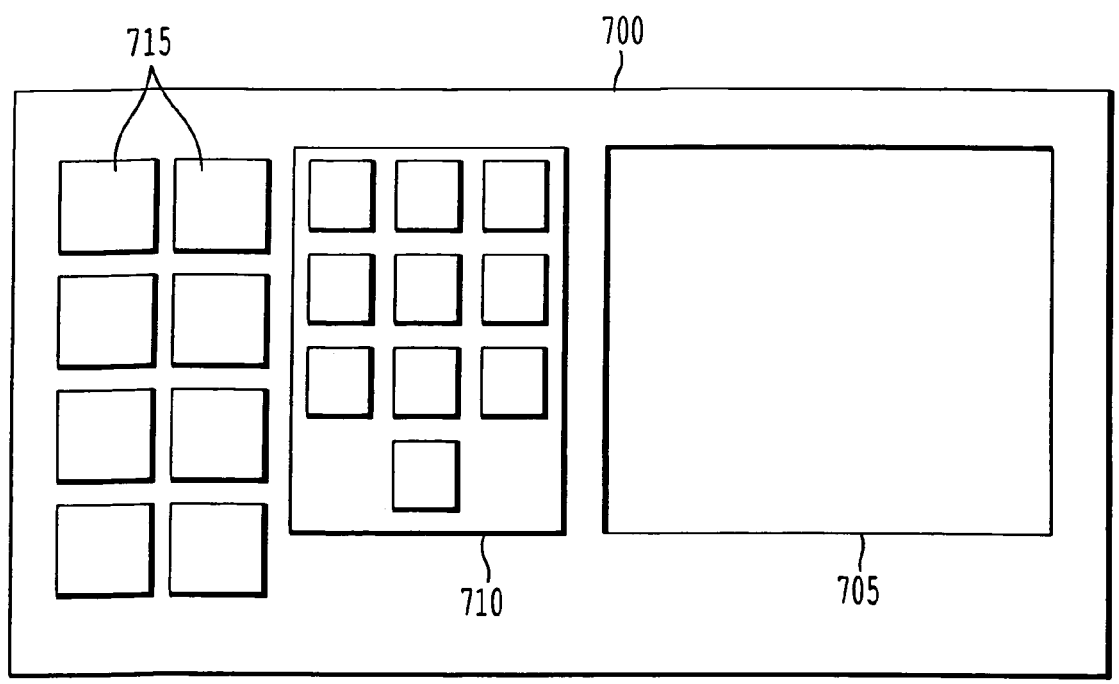
FIG. 11 shows a second example of an application unit to which the present invention can be applied.

As a further example, and as noted above, the application unit 300 may be an image forming device such as the digital image forming apparatus 26, facsimile machine 28, or printer 32 also shown in FIG. 1. In this instance, the user interface 510 may take the form of an operation panel (e.g. operation panel 174 in FIG. 3) with a plurality of keys and/or a touch screen which a user operates to control the image forming device. One illustrative embodiment of such a user interface 510 used with a digital image forming apparatus 26, facsimile machine 28, or printer 32 is shown in FIG. 11. In that embodiment, the present invention monitors each time a user presses one of the control buttons on the operation panel and logs the usage data of such a user usage for subsequent communication.

As shown in FIG. 11, such an operation panel 700 may include a touch screen 705 on which various commands may appear which an operator can select by touching different portions of the touch screen 705. The operation panel 700 may also include a 10-key pad 710 and various other control buttons 715. In the case of an image forming device, the control buttons 715 may be commands for selecting a paper size, changing a magnification, changing a darkness of a desired image, etc.

When the application unit 300 in FIG. 9 is an image forming device and the user interface 510 corresponds to the operation panel 700 as shown in FIG. 11, the present invention can monitor the commands (shown in FIG. 11) that a user selects. The operation panel 700 shown in FIG. 11 may, with modifications, also be an operation panel for a user-controlled appliance such as a microwave oven, VCR, digital camera, cellular phone, palm top computer, etc.

Figure 10:
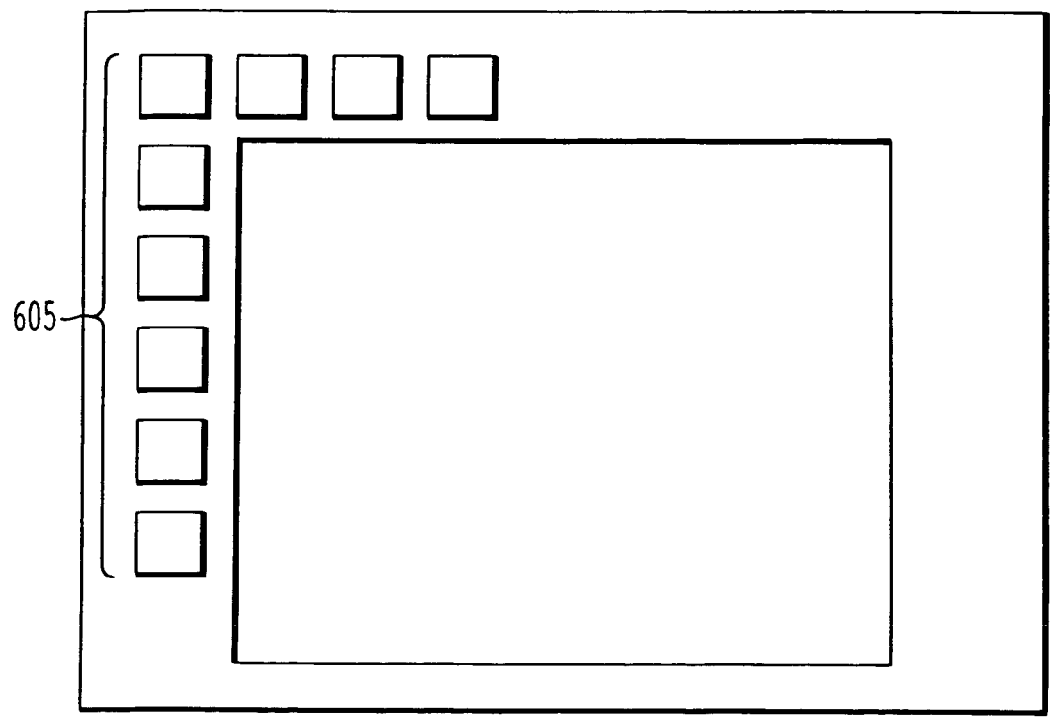
FIG. 10 shows a first example of an application unit to which the present invention can be applied.

FIGS. 10 and 11 show examples of the application unit 300 and user interface 510 of FIG. 9 to which the present invention can be applied. As would be readily apparent to those of ordinary skill in the art, the present invention is directed to various types of application units including various types of user interfaces. The present invention is applicable to any device to be monitored which includes a user interface.

Returning to FIG. 9, the present invention further includes a monitoring and logging block 515 and a sending block 520. The monitoring and logging block 515 monitors the user's usage of the user interface 510 and records or logs data of such monitored usage. At a designated time, the logged data of the user's usage of the user interface 510 is then sent to the sending block 520, which then communicates such monitored usage data to a designated party. The monitoring and logging block 515 can be implemented in the device including the application unit 300 or in another system control element. The sending block can also be implemented in the device including the application unit in FIG. 6C, or can also be implemented in the computer 301 in FIG. 6B to which the application unit is attached. The present invention can also take the form of computer control codes recorded on a computer readable medium.

Figure 12:
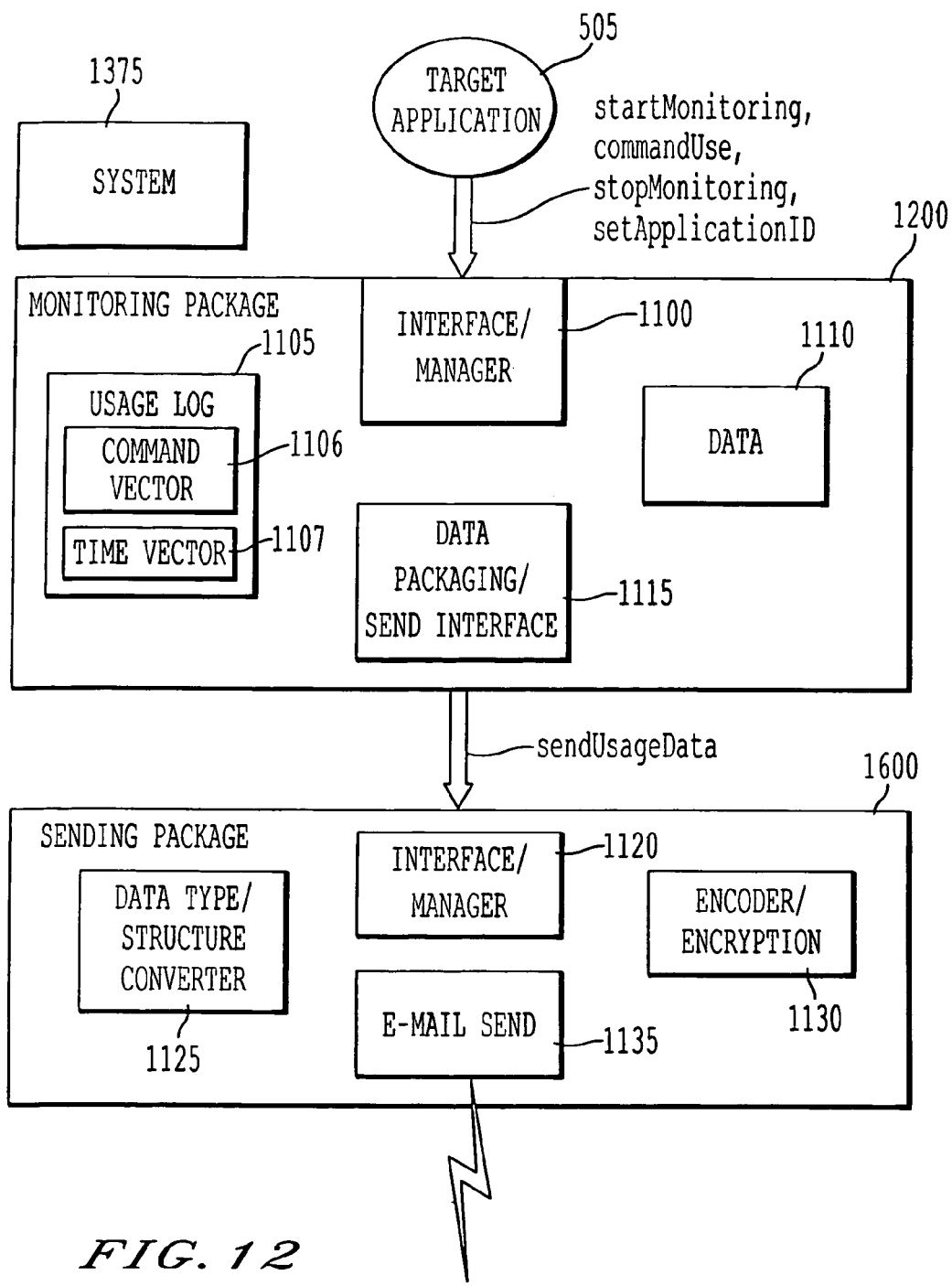
FIG. 12 shows the general architecture of the system.

FIG. 12 shows the general architecture of the system that consists of the Monitoring Package 1200 and the Sending Package 1600. The Monitoring Package 1200 provides four interface functions, startMonitoring, commandUse, stopMonitoring, and setApplicationID, to the target application 505 in order to monitor its usage. The Monitoring Package 1200 is responsible for monitoring and logging the usage of the target application 505 and then passing the information about the usage of the target application 505 to the Sending Package 1600. The Monitoring Package 1200 incorporates the use of four components, Interface/Manager 1100, UsageLog 1105, Data 1110, and Data Packaging/Send Interface 1115, to perform the above stated tasks. The Interface/Manager 1100 provides the functions that allow the target application 505 to interface with the Monitoring Package 1200. The Interface/Manager 1100 also manages the usage data of the target application 505 within the Monitoring Package 1200. The UsageLog 1105 logs and maintains the usage data of the target application 505. The UsageLog 1105 contains a Command Vector 1106 and Time Vector 1107 to log and maintain information about the use of the commands of the target application 505. The Data 1110 contains the usage data of the target application 505. The Data Packaging/Send Interface 1115 packages the usage data of the target application 505 and interfaces with the Sending Package 1600 so that it may pass the packaged usage data of the target application 505 to the Sending Package 1600.

As shown in FIG. 12, the Sending Package 1600 provides the interface function sendUsageData to the Monitoring Package 1200 in order to send the usage data of the target application 505. The Sending Package 1600 is responsible for sending the usage data of the target application 505 by e-mail to a desired party. The Sending Package 1600 includes the four components, Interface/Manager 1120, Data Type/Structure Converter 1125, Encoder/Encryption 1130, and E-mail Send 1135. The Interface/Manager 1120 provides the function that allows the Monitoring Package 1200 to interface with the Sending Package 1600. The Interface/Manager 1120 also manages the usage data of the target application 505 within the Sending Package 1600. The Data Type/Structure Converter 1125 changes the usage data of the target application 505. As an example, if the usage data corresponds to the sequence of commands used in the target application 505, the Data Type/Structure Converter 1125 can change the usage data to correspond to the frequency of use of the commands of the target application 505. The Encoder/Encryption 1130 encodes and encrypts the usage data of the target application 505 into a message body so that it may be sent by e-mail. The E-mail Send 1135 sends the usage data of the target application 505. Also shown in FIG. 12 is the System object 1375 that will allow the Monitoring Package 1200 and the Sending Package 1600 to access and set system information.

Figure 13:
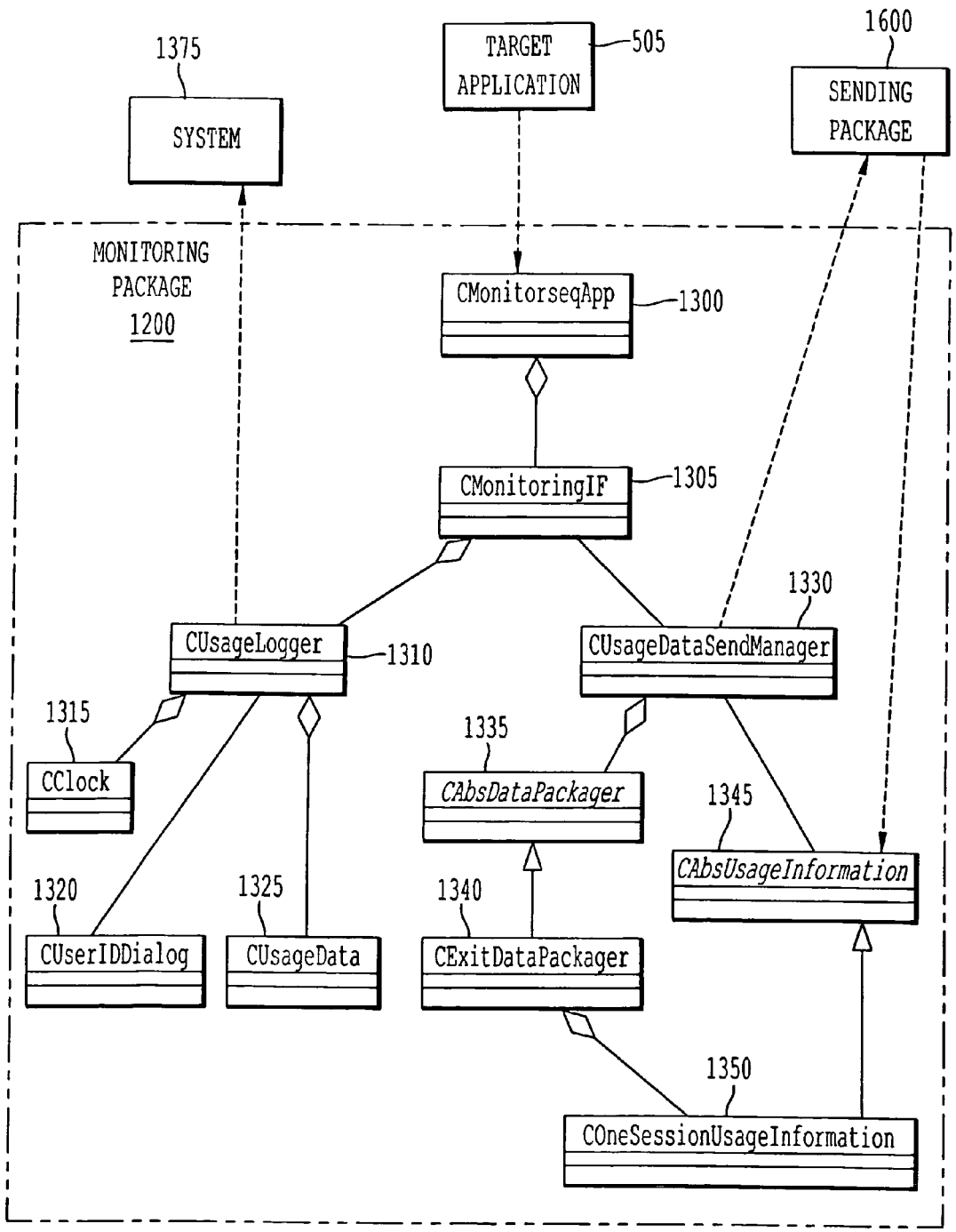
FIG. 13 shows an overall view of objects executed in the present invention.

FIG. 13 shows an overall system view of portions of the application unit 300. FIG. 13 (as well as subsequent figures) describes the system and its operations in an object oriented format utilizing the unified modeling language such as is described in "The Unified Modeling Language User Guide" by Booch et al., published by Addison-Wesley, 1999.

In FIG. 13 the dashed-block contains objects responsible for the monitoring functions, and thus collectively indicates the Monitoring Package 1200. A CMonitorseqApp object 1300 provides the interface functions so that the target application 505 can use the monitoring functions. A CMonitoringIF object 1305 performs monitoring functions of the target application 505. A CUsageLogger object 1310 includes functions for logging monitored data obtained by the CMonitoringIF object 1305. A CClock object 1315 includes functions that allow the Monitoring Package 1200 to obtain time information. A CUserIDDialog object 1320 provides the dialog box for the user to enter in the user ID. The CUsageLogger object 1310 interacts with a System object 1375 to access and set system information. The CUsageLogger object 1310 also interacts with a CUsageData object 1325 which is a storage for the logged data.

As shown in FIG. 13, the CMonitoringIF object 1305 interacts with a CUsageDataSendManager object 1330. The CUsageDataSend Manager object 1330 controls transmitting monitored data of a user's usage of a target application 505 as monitored by the CMonitoringIF object 1305. This CUsageDataSendManager object 1330 interacts with (1) a CAbsDataPackager object 1335 (which packages the usage data to be transmitted) and (2) a CAbsUsageInformation object 1345 (which contains the usage data to be transmitted). The CAbsDataPackager object 1335 corresponds to an abstract class which provides the interface functions to package the usage data of the target application 505. The class that is derived from the abstract class CAbsDataPackager 1335 is CExitDataPackager object 1340 which provides the method for packaging the usage data of the target application 505. The CExitDataPackager object 1340 packages the usage data for a single session of a target application 505. When the CUsageDataSendManager object 1330 interacts with CAbsDataPackager object 1335 to package the usage data of a target application 505, it is actually using the packaging method provided by the CExitDataPackager object 1340. The CExitDataPackager object 1335 packages the usage data of the target application 505 into a COneSessionUsageInformation object 1350. The COneSessageeInformation object 1350 contains the usage data for one session of the target application 505. The CAbsUsageInformation object 1345 corresponds to an abstract class which provides the interface to access the usage data of the target application 505. The class that is derived from the abstract class CAbsUsageInformation 1345 is COneSessionUsageInformation object 1350 which provides the method for accessing the usage data of the target application 505. The CUsageDataSendManager object 1330 also interacts with the Sending Package 1600 to send the usage data of the target application 505 by e-mail to a desired party. The Sending Package 1600 interacts with the CAbsUsageInformation object 1345. When the Sending Package 1600 interacts with CAbsUsageInformation object 1345 to access the usage data of the target application 505, it is actually using the accessing method provided by the COneSessionUsageInformation object 1350.

Figure 14:
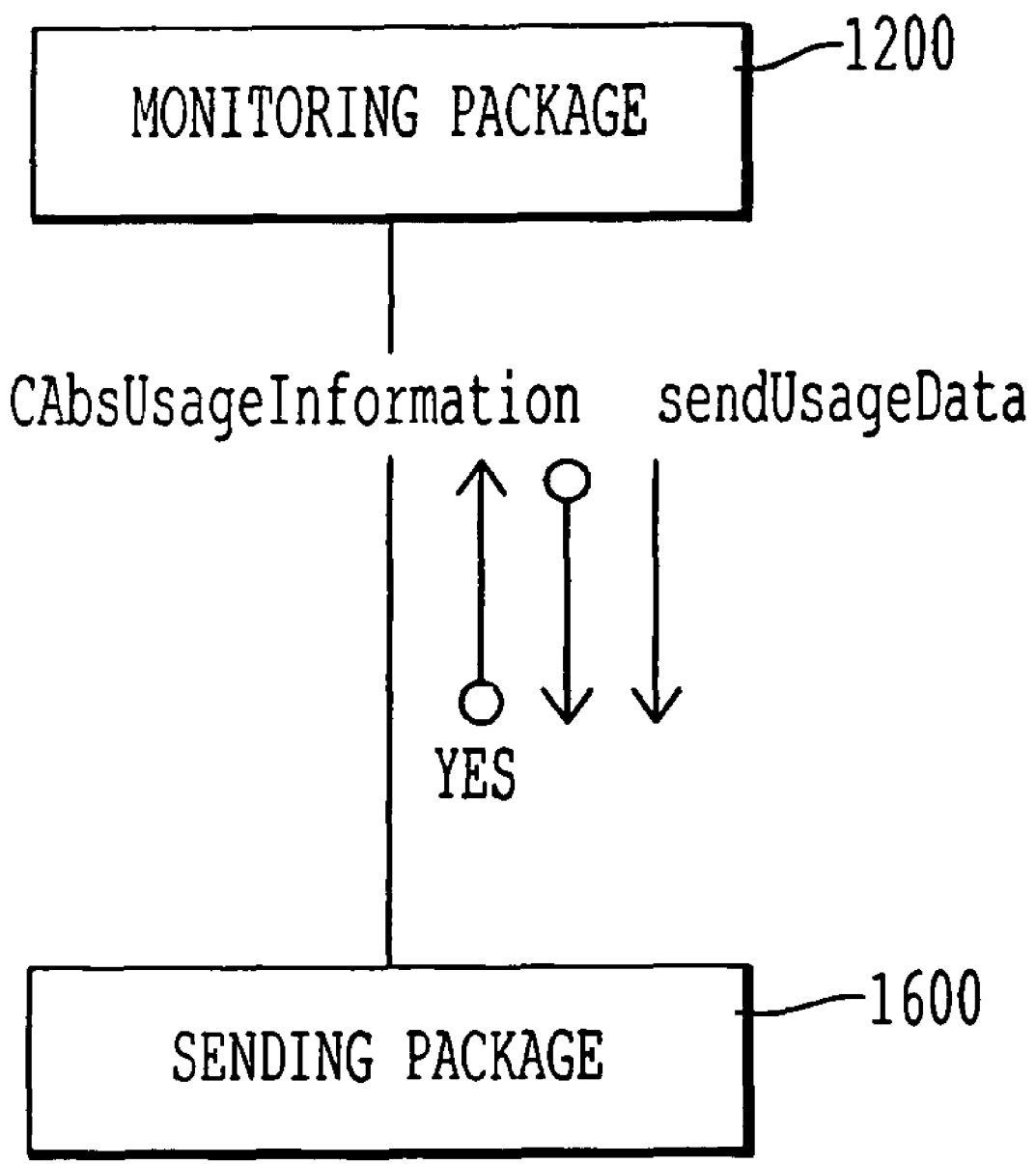
FIG. 14 shows information in an abstract class transferred between a monitoring package and a sending package in the present invention.

FIG. 14 shows an overall operation executed in the system of FIG. 13 between the Monitoring Package 1200 and Sending Package 1600. More particularly, the Monitoring Package 1200 calls a function sendUsageData to the Sending Package 1600 and provides CAbsUsageInformation to the Sending Package 1600. The CAbsUsageInformation is usage information from the monitored target application 505. This operation instructs the Sending Package 1600 to send the CAbsUsageInformation provided from the Monitoring Package 1200. The Sending Package 1600 sends a confirmation signal YES to the Monitoring Package 1200 to indicate that it was successful in sending the usage data of the target application 505.

Figure 15A:
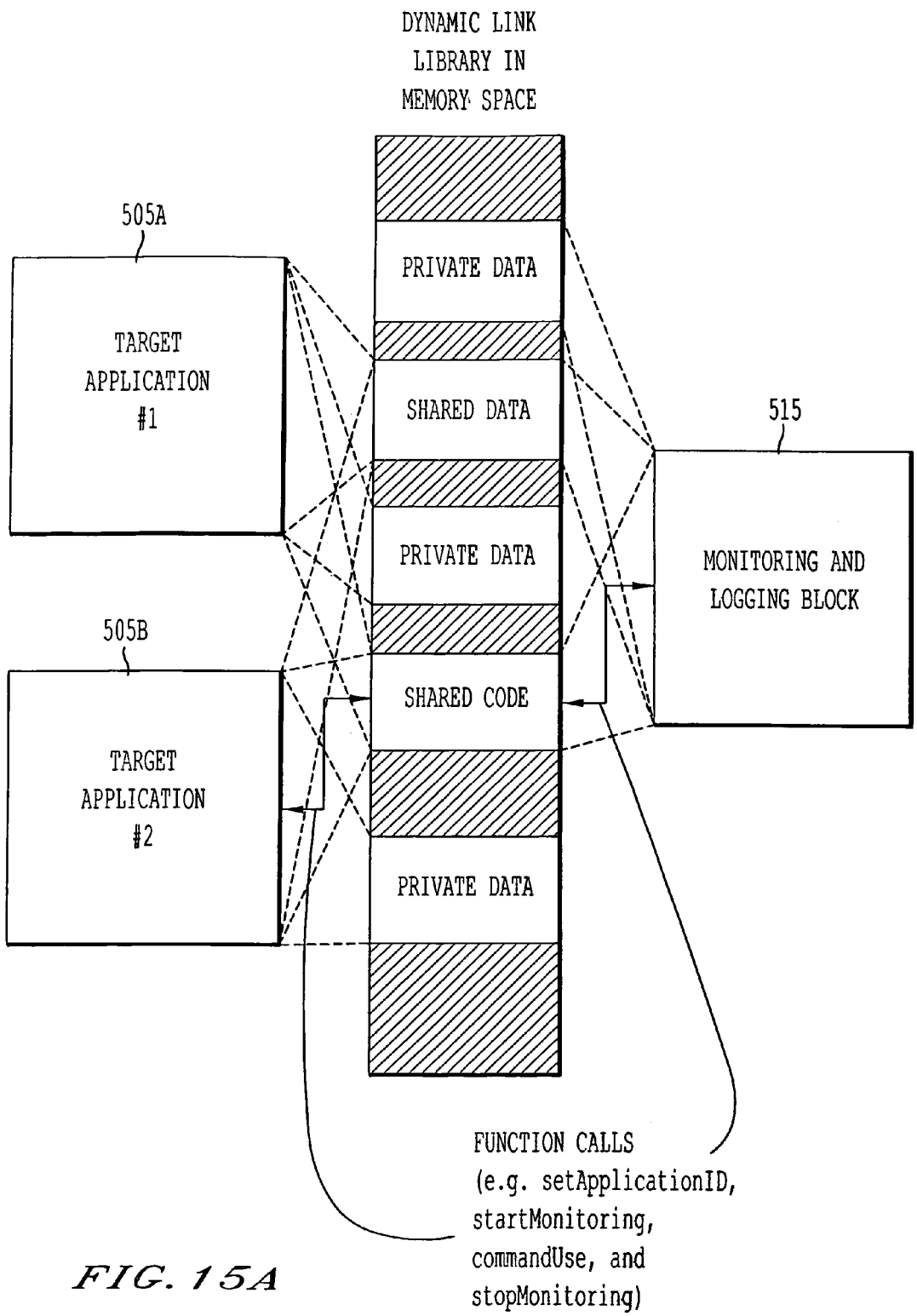
FIGS. 15A and 15B show multiple target applications interacting with a dynamic link library (DLL) to communicate with a monitoring package (implemented as either a separate process or within the DLL itself)
Figure 15B:
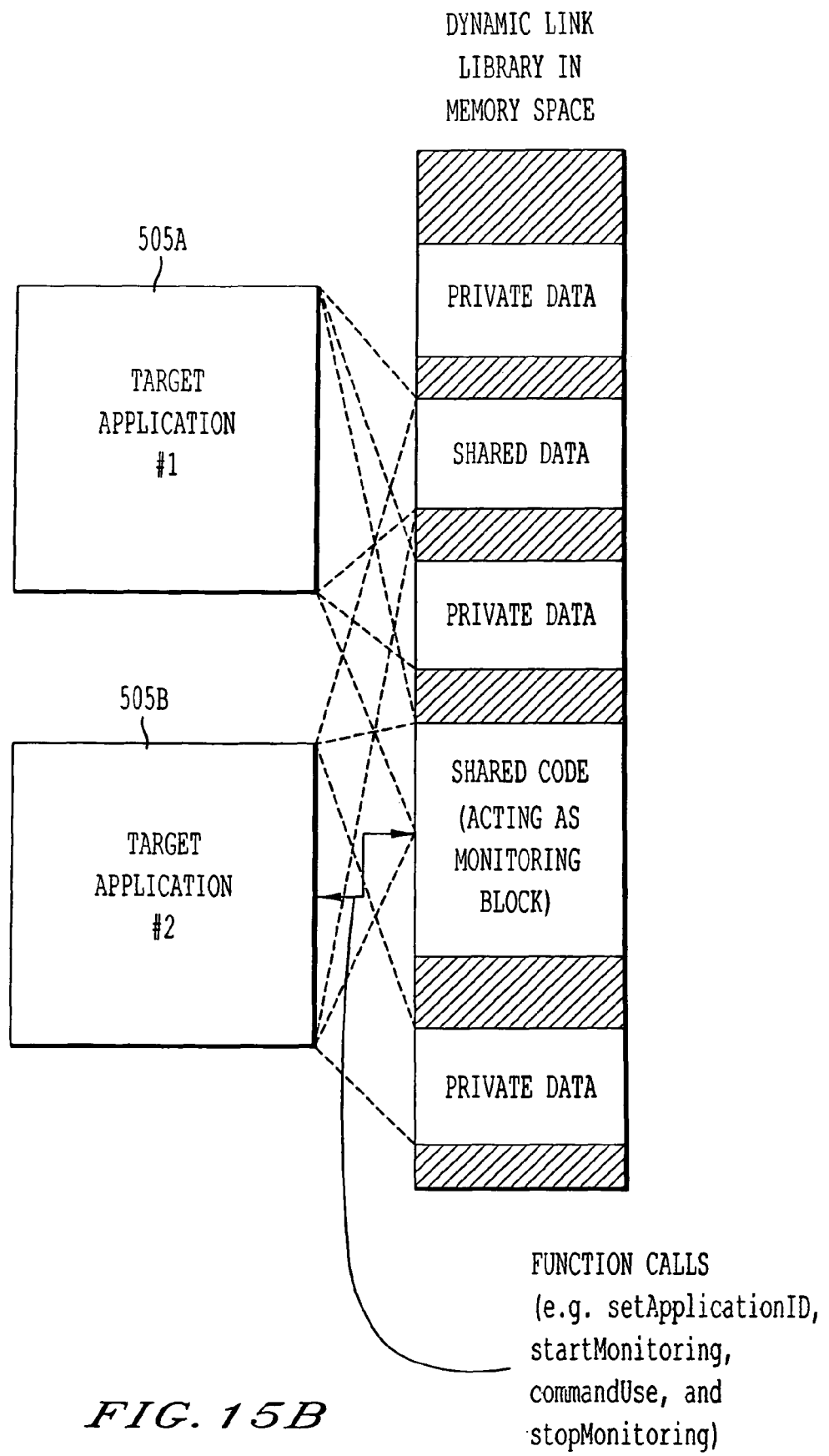

In an alternate embodiment of the present invention illustrated in FIGS. 15A and 15B, rather than running a single target application 505, the application unit 300 runs plural target applications 505A and 505B. Those target applications 505A and 505B may either be multiple instances of the same application or copies of plural different applications. One such example of an application unit 300 with plural target applications is a single computer with plural touch screens controlled by different applications. Touch screen-based applications are now being utilized in department stores to provide customers with information (e.g., gifts registered as part of a bridal registry or a baby registry).

It is unnecessary, however, to reproduce in each application the code that interacts with the monitoring block 515. Instead, as shown in FIG. 15A, target application 505A and target application 505B can share code and data in the form of a dynamic linked library. (Additional details about dynamic linked libraries (DLLs) can be found in Chapter 11 of Mastering Windows NT Programming, by Myers and Hamer, 1993, incorporated herein by reference.) As illustrated, the target application 505B invokes any of the functions exported by the DLL in the shared code region of the memory space. For example, as discussed in more detail below, the target applications can execute any of the following functions: setApplicationID, startMonitoring, commandUse, stopMonitoring. By utilizing a separate process to implement the monitoring block 515, the system of the present invention can operate independently to perform periodic tasks or tasks occurring at specific times or under specific conditions. One such independent operation is transmitting the monitored usage information to the receiver 318 at specified intervals (as is discussed in greater detail below in relation to trigger conditions).

In the alternate embodiment illustrated in FIG. 15B, the monitoring and logging block 515 is no longer implemented as a separate process. Instead, the monitoring and logging block is included in the shared code region of the dynamic linked library. As in the embodiment of FIG. 15A, the target applications still invoke functions exported by the DLL to track the operations performed on the interface by using the setApplicationID, startMonitoring, commandUse, and stopMonitoring functions.

The operations performed by the various objects noted in FIGS. 13 and 14 are now discussed in further detail in FIGS. 16-21. In FIGS. 16-21 the various functions are preceded by a numeral and a colon. It should be noted that this nomenclature is not always indicative of the order of the various operations as various operations can be performed in parallel and at different times.

Figure 16:
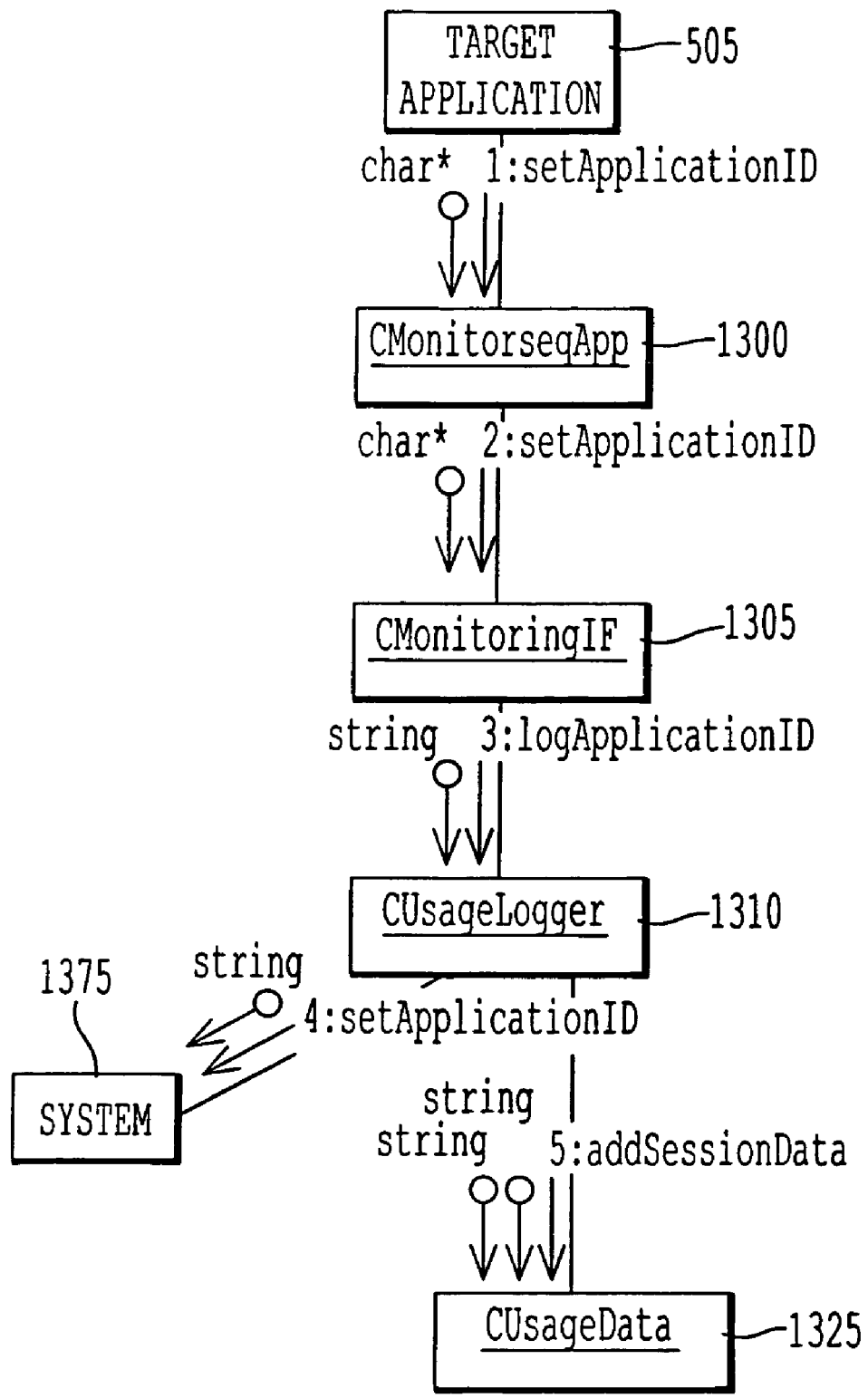
FIG. 16 shows a setApplicationID operation executed in the present invention.

FIG. 16 shows a setApplicationID function executed in the present invention. As shown in FIG. 16, when the target application starts up, the target application 505 passes a char* as a parameter as it calls the setApplicationID function of the CMonitorseqApp object 1300. The char* represents the identity of the application in which its usage is being monitored. In turn, the CMonitorseqApp object 1300 passes the same char* as a parameter as it calls the setApplicationID function of the CMonitoringIF object 1305. The CMonitoringIF object 1305 will inform the Monitoring Package 1200 to log the application ID. The CMonitoringIF object 1305 passes a string as a parameter as it calls the logApplicationID function of the CUsageLogger object 1310. The string represents the identity of the application in which its usage is being monitored. The CUsageLogger object 1310 passes the same string as a parameter as it calls the setApplicationID function of the System object 1375 to set the application ID within the system. Then the CUsageLogger object 1310 passes two strings as parameters as it calls the addSessionData function of the CUsageData object 1325 to store information about the application ID. One string represents the type of information passed in and the other string represents the value of the type of information. In this instance, the first string indicates that the type of information is the application ID and the second string is the value of the application ID.

Figure 17:
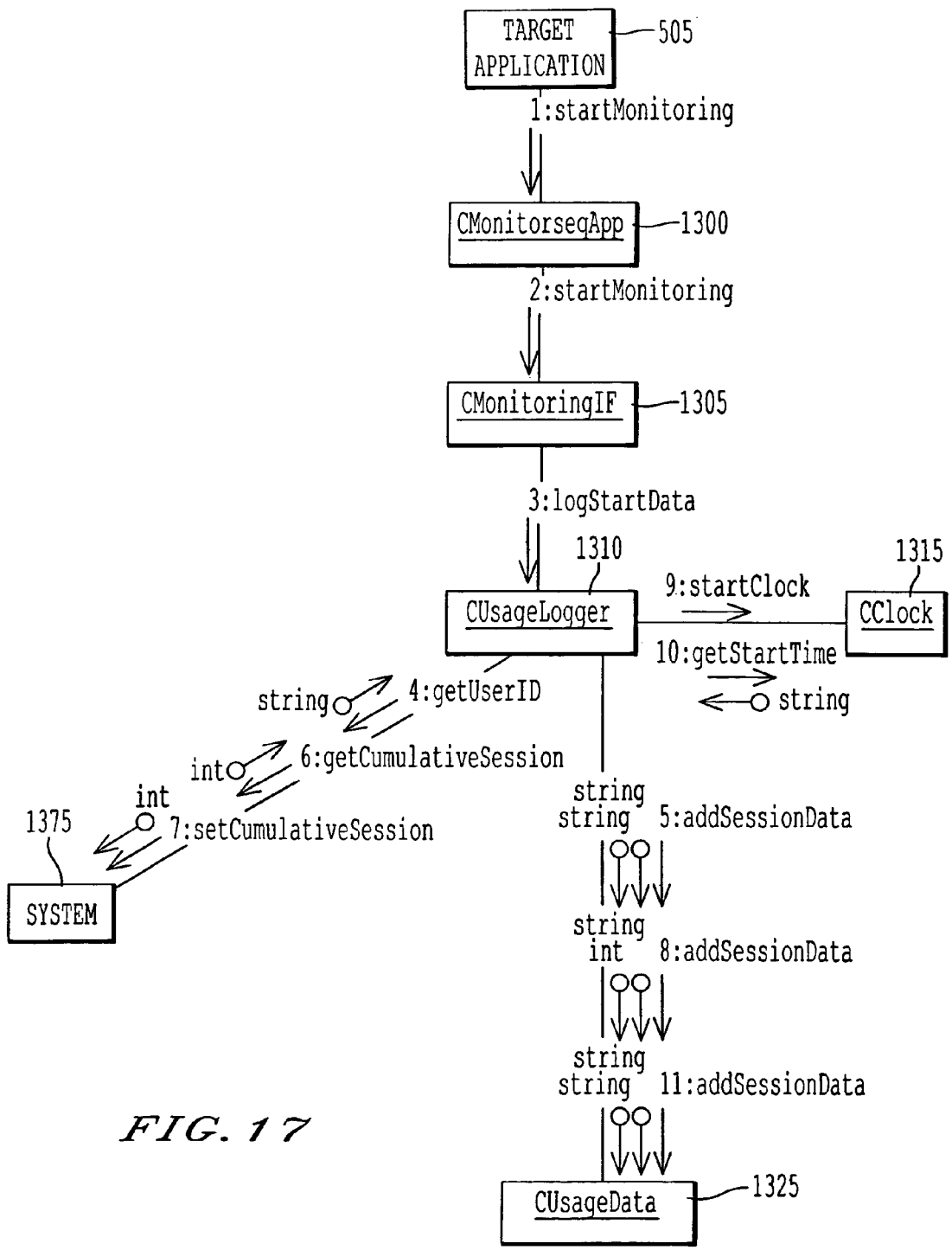
FIG. 17 shows a startMonitoring operation executed in the present invention.

FIG. 17 shows a startMonitoring function executed in the present invention. After the target application 505 executes the setApplicationID function as shown in FIG. 16, the target application 505 calls the startMonitoring function of the CMonitorseqApp object 1300. In turn, the CMonitorseqApp object 1300 calls the startMonitoring function of the CMonitoringIF object 1305. This operation indicates that the logging of data corresponding to a user's usage of a user interface 510 of the target application 505 is to begin. The CMonitoringIF object 1305 then calls a logStartData function of the CUsageLogger object 1310.

The CUsageLogger object 1310 then calls a getUserID function of the System object 1375 and the System object 1375 returns a string to the CUsageLogger object 1310. The string returned by the System object 1375 represents the user ID. The CUsageLogger object 1310 passes two strings as parameters as it calls the addSessionData function of the CUsageData object 1325 to store information about the user ID. In this instance, the first string indicates that the type of information is the user ID and the second string is the value of the user ID.

The CUsageLogger object 1310 then calls getCumulativeSession function of the System object 1375 and the System object 1375 returns an int to the CUsageLogger object 1310. In this operation the CUsageLogger object 1310 obtains the number of times that the users have used the target application 505 to be monitored from the System object 1375. The CUsageLogger object 1310 updates the number of times that the users have used the target application 505 to be monitored and passes this number as a parameter as it calls the setCumulativeSession function of System object 1375 to set this number within the system. The CUsageLogger object 1310 also passes a string and an int as parameters as it calls the addSessionData function of the CUsageData object 1325 to store information about the cumulative use of the target application 505. In this instance, the string indicates that the type of information is the number of times that the users have used the target application 505 to be monitored and the int is the value of this number.

The CUsageLogger object 1310 then calls the startClock function of the CClock object 1315. This operation sets the start time of the target application 505 to be monitored in the CClock object 1315. The CUsageLogger object 1310 then calls the getStartTime function of the CClock object 1315 and the CClock object 1315 returns a string to the CUsageLogger object 1310. The string returned by the CClock object 1315 represents the start time of the target application 505 to be monitored. The CUsageLogger object 1310 passes two strings as parameters as it calls the addSessionData function of the CUsageData object 1325 to store information about the start time of the target application 505. In this instance, the first string indicates that the type of information is the start time of the target application 505 and the second string is the value of the start time.

Figure 18:
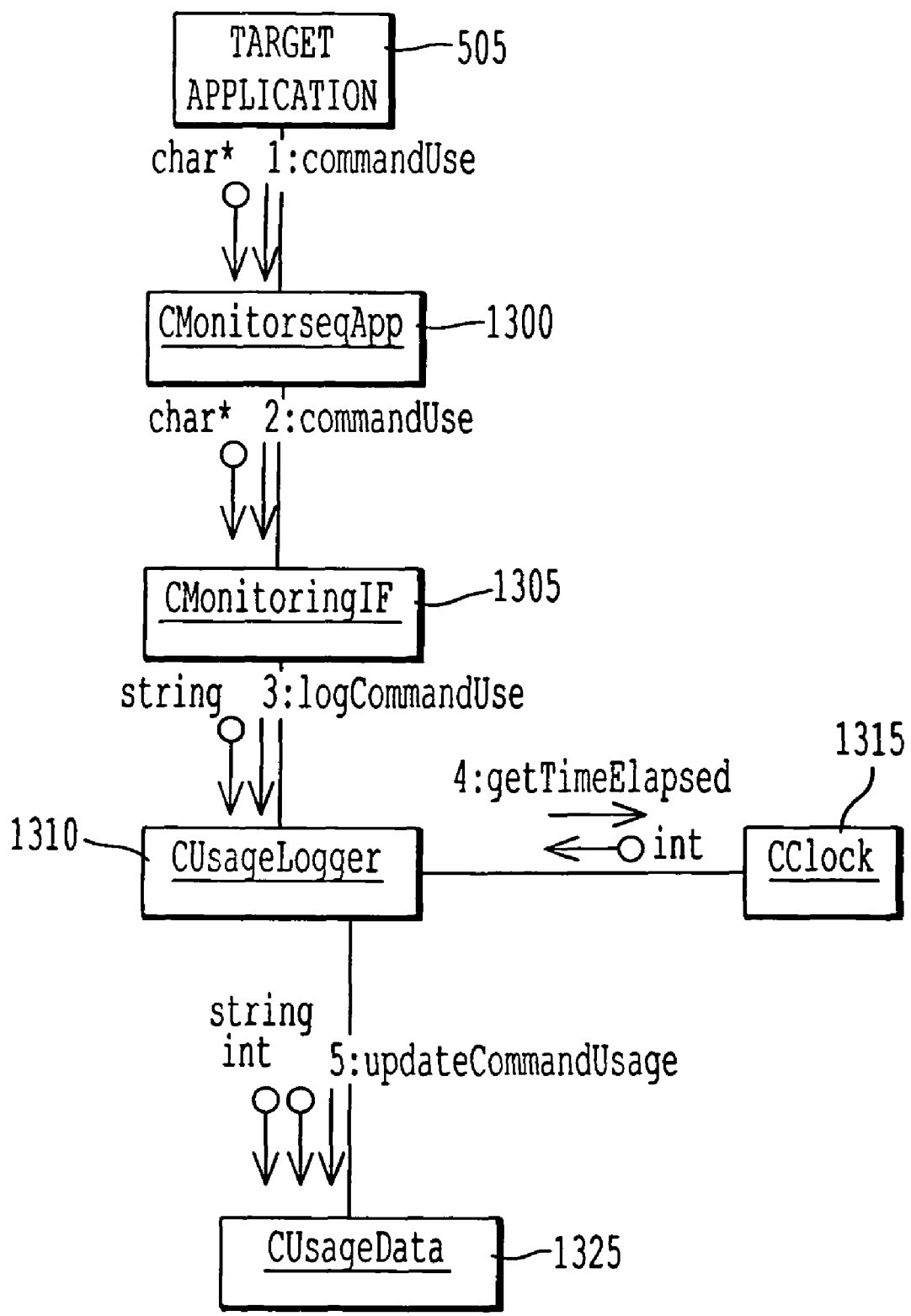
FIG. 18 shows a commandUse operation executed in the present invention.

FIG. 18 shows a commandUse function that is called when the user uses the user interface 510 of the target application 505. FIG. 18 shows an example of the actual monitoring and logging operations executed in the present invention when a user "clicks" on a command in a software-based target application or presses a button on an operation panel of an appliance, image forming device, etc.

In FIG. 18, when a user selects a particular command from the user interface 510 of the target application 505 being monitored, the target application 505 passes a char* as a parameter as it calls the commandUse function of the CMonitorseqApp object 1300. The char* represents the name of the command on the user interface 510 selected by the user. In turn, the CMonitorseqApp object 1300 passes the same char* as a parameter as it calls the commandUse function of the CMonitoringIF object 1305. The CMonitoringIF object 1305 will inform the Monitoring Package 1200 to log the command on the user interface 510 selected by the user.

The CMonitoringIF object 1305 then passes a string as a parameter as it calls the logCommandUse function of the CUsageLogger object 1310. The string represents the name of the command on the user interface 510 selected by the user. The CUsageLogger object 1310 calls the getTimeElapsed function of CClock object 1315 and the CClock object 1315 returns an int to the CUsageLogger object 1310. In this operation the CClock object 1315 returns an int that represents the time elapsed since the start of the target application 505 to the time that the user selects the command on the user interface 510. The int represents the time elapsed in tenths of a second. The CUsageLogger object 1310 passes a string and an int as parameters as it calls the updateCommandUsage function of the CUsageData object 1325 to store information about the command usage of the target application 505. In this instance, the string represents the name of the command on the user interface 510 selected by the user and the int is the time elapsed since the start of the target application 505 to the time that the user selects the command on the user interface 510.

Figure 19:
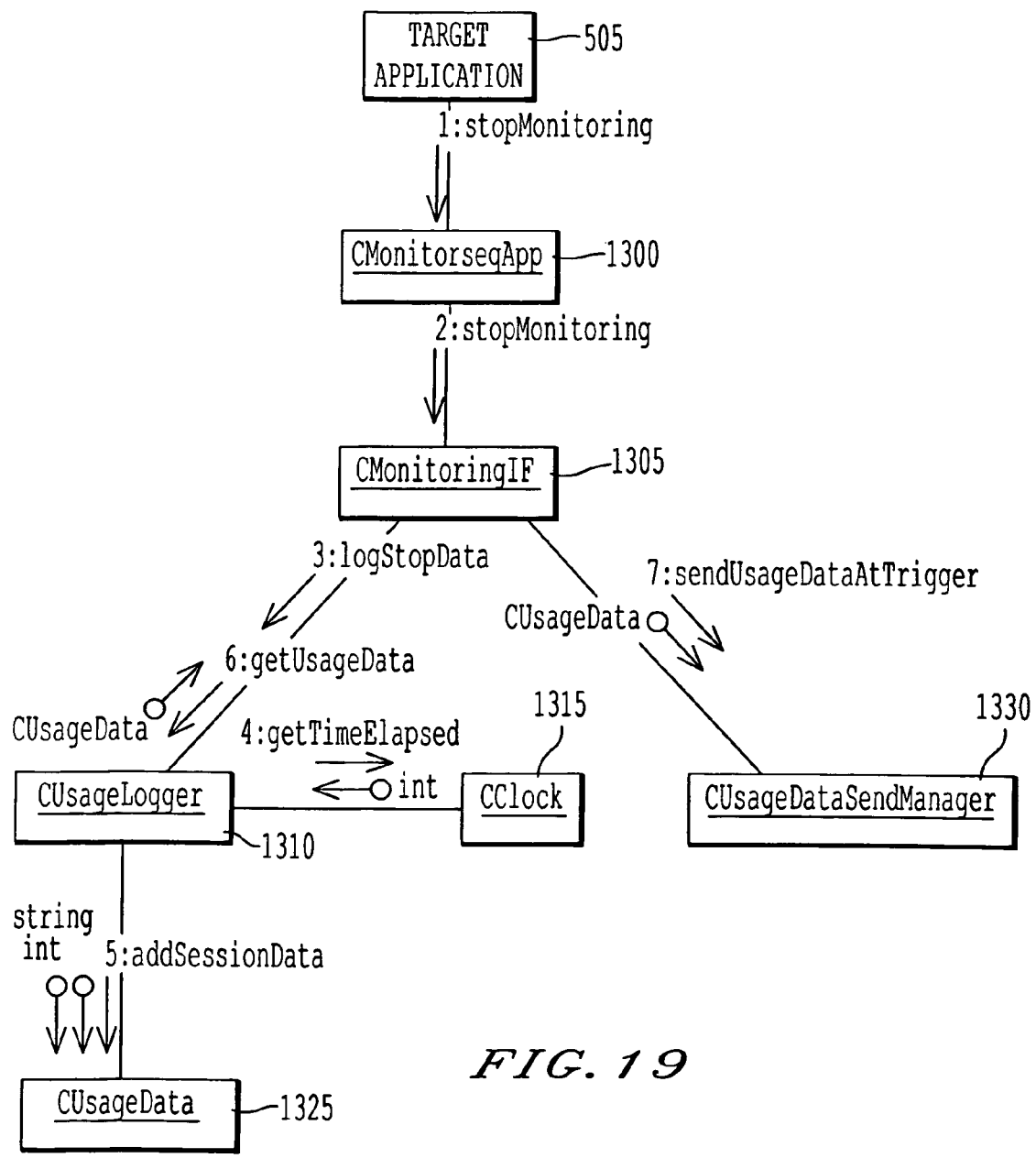
FIG. 19 shows a stopMonitoring operation executed in the present invention.

FIG. 19 shows a stopMonitoring function executed in the present invention for stopping the monitoring of the user's usage of the user interface 510 of the target application 505. Monitoring of the user's usage of the user interface 510 can be stopped when the user exits the target application 505. For example, when the target application 505 is software running on a workstation, the monitoring can be stopped when the user exits a program being executed. When the target application 505 is an operation panel of an appliance, an image forming device, etc., the monitoring can be stopped when a particular icon/button, such as a start button of a copier, is pressed. The monitoring can also be stopped after a predetermined period of time, after a predetermined period of time during which the user does not use the target application, etc. Similar conditions for stopping monitoring of a user's usage of the user interface 510 can be executed when the target application 505 is an image forming device such as a copy machine, facsimile machine, printer, scanner or an appliance such as a microwave oven, VCR, digital camera, cellular phone, palm top computer, etc. Again, illustrative circumstances in which the monitoring can be stopped are: when the user inputs an exit command, after a predetermined time, after a predetermined time of non-usage.

In FIG. 19, when the user is exiting from the target application 505, the target application 505 calls the stopMonitoring function of the CMonitorseqApp object 1300. In turn, the CMonitorseqApp object 1300 calls the stopMonitoring function of the CMonitoringIF object 1305. This operation indicates that the logging of data corresponding to a user's usage of a user interface 510 of the target application 505 is to stop. The CMonitoringIF object 1305 then calls a logStopData function of the CUsageLogger object 1310.

The CUsageLogger object 1310 then calls the getTimeElapsed function of CClock object 1315 and the CClock object 1315 returns an int to the CUsageLogger object 1310. In this operation the CClock object 1315 returns an int that represents the time elapsed since the start of the target application 505 to the time that the user exits the target application. The int represents the time elapsed in tenths of a second. The CUsageLogger object 1310 passes a string and an int as parameters as it calls the addSessionData function of the CUsageData object 1325 to store information about the duration of use of the target application 505. In this instance, the string indicates that the type of information is the duration of use of the target application 505 and the int is the value of this duration.

After the CUsageLogger object 1310 logs the duration of the target application 505, the CMonitoringIF object 1305 calls the getUsageData function of CUsageLogger object 1310 and the CUsageLogger object 1310 returns the CUsageData to the CMonitoringIF object 1305. The CUsageData contains data which includes all the stored monitoring data of the current session of the target application 505. The data includes the application ID, user ID, cumulative usage, start time, duration and command usage. The CMonitoringIF object 1305 then passes the CUsageData as a parameter as it calls the sendUsageDataAtTrigger function of the CUsageDataSendManager object 1330 to send the usage data of the target application 505.

Figure 20:
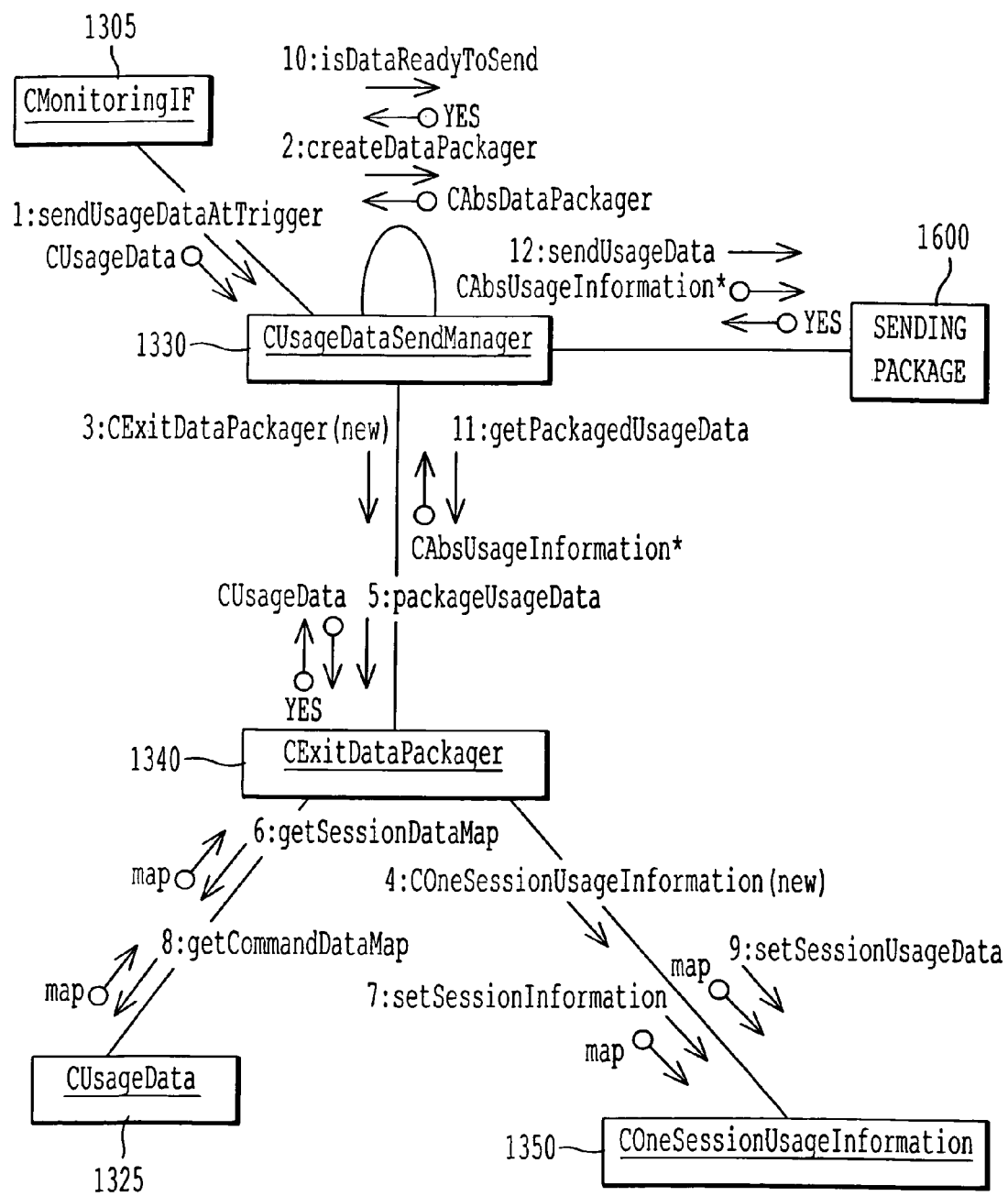
FIG. 20 shows the operation of packaging the usage data of the target application and passing it to the sending package in the present invention.

FIG. 20 shows the operation of packaging the usage data of the target application 505 and passing it to the Sending Package 1600 when the user exits the target application 505. This operation occurs when the target application 505 calls the stopMonitoring function of the Monitoring Package 1200. The operations in FIG. 20 are continuations of the operations of FIG. 19. The sendUsageDataAtTrigger function of the CUsageDataSendManager object 1330, as of step 7, in FIG. 19 corresponds to the sendUsageDataAtTrigger function of the CUsageDataSendManager object 1330, as of step 1, in FIG. 20.

After the sendUsageDataAtTrigger function of the CUsageDataSendManager object 1330 is called in FIG. 20, the CUsageDataSendManager object 1330 calls its own createDataPackager function and returns a CAbsDataPackager. The CAbsDataPackager is an object that the CUsageDataSendManager object 1330 will use to package the usage data of the target application 505 before it passes the usage data to the Sending Package 1600. Within the CUsageDataSendManager object 1330 call to its own createDataPackager function, it calls the CExitDataPackager function of the CExitDataPackager object 1340 to create the CExitDataPackager object 1340. The CExitDataPackager object 1340 packages the usage data of the target application 505 for the condition when the usage data of the target application 505 is to be sent every time the user exits the target application 505. Then the CExitDataPackager object 1340 calls the COneSessionUsageInformation function of the COneSessionUsageInformation object 1350 to create the COneSessionUsageInformation object 1350. The COneSessionUsageInformation object 1350 stores the usage data for a single session of the target application 505. Even though the createDataPackager function returns the abstract class CAbsDataPackager 1335 to the CUsageDataSendManager object 1330, it is actually the derived class CExitDataPackager 1340 of the abstract class CAbsDataPackager 1335 that is being returned to the CUsageDataSendManager object 1330. The CUsageDataSendManager object 1330 is not aware that it will be using the CExitDataPackager object 1340 to package the usage data of the target application 505.

As shown in FIG. 20, the CUsageDataSendManager object 1330 then passes the CUsageData as a parameter as it calls the packageUsageData function of the CExitDataPackager object 1340. The CExitDataPackager object 1340 returns a confirmation signal YES to the CUsageDataSendManager object 1330 to indicate that it was successful in packaging the usage data of the target application 505. This operation packages the usage data of the target application 505 into an object that will be passed to the Sending Package 1600. The CExitDataPackager object 1340 calls the getSessionDataMap function of the CUsageData object 1325 and the CUsageData object 1325 returns a map to the CExitDataPackager object 1340. The map contains usage data about the current session of the target application 505. The usage data includes the application ID, the user ID, the cumulative use, the start time, and the duration. The CExitDataPackager object 1340 then passes this map as a parameter as it calls the setSessionInformation function of the COneSessionUsageInformation object 1350. The CExitDataPackager object 1340 calls the getCommandDataMap function of the CUsageData object 1325 and the CUsageData object 1325 returns a map to the CExitDataPackager object 1340. The map contains usage data about the command used in the current session of the target application 505. The CExitDataPackager object 1340 then passes this map as a parameter as it calls the setSessionUsageData function of the COneSessionUsageInformation object 1350. With both maps set in the COneSessionUsageInformation object 1350, the usage data is packaged into an object that can be passed to the Sending Package 1600.

The CUsageDataSendManager object 1330 calls its own isDataReadyToSend function and returns YES to indicate that the usage data is ready to be passed to the Sending Package 1600. The CUsageDataSendManager object 1330 calls the getPackagedUsageData function of the CExitDataPackager object 1340 and the CExitDataPackager object 1340 returns a CAbsUsageInformation to the CUsageDataSendManager object 1330. Even though the getPackagedUsageData function of the CExitDataPackager object 1340 returns the abstract class CAbsUsageInformation 1345 to the CUsageDataSendManager object 1330, it is actually the derived class COneSessionUsageInformation 1350 of the abstract class 1330. The CUsageDataSendManager object 1330 is not aware that it has the COneSessionUsageInformation object 1350 which contains the usage data to be passed to the Sending Package 1600. The CUsageDataSendManager object 1330 then passes the CAbsUsageInformation as a parameter as it calls the sendUsageData function of the Sending Package 1600. The Sending Package 1600 returns a confirmation signal YES to inform the CUsageDataSendManager object 1330 that the usage data was successfully sent to the desired party. Even though the abstract class CAbsUsageInformation 1345 was passed to the Sending Package 1600, it is not aware that it was actually the COneSessionUsageInformation object 1350 that was passed to it.

Figure 21:
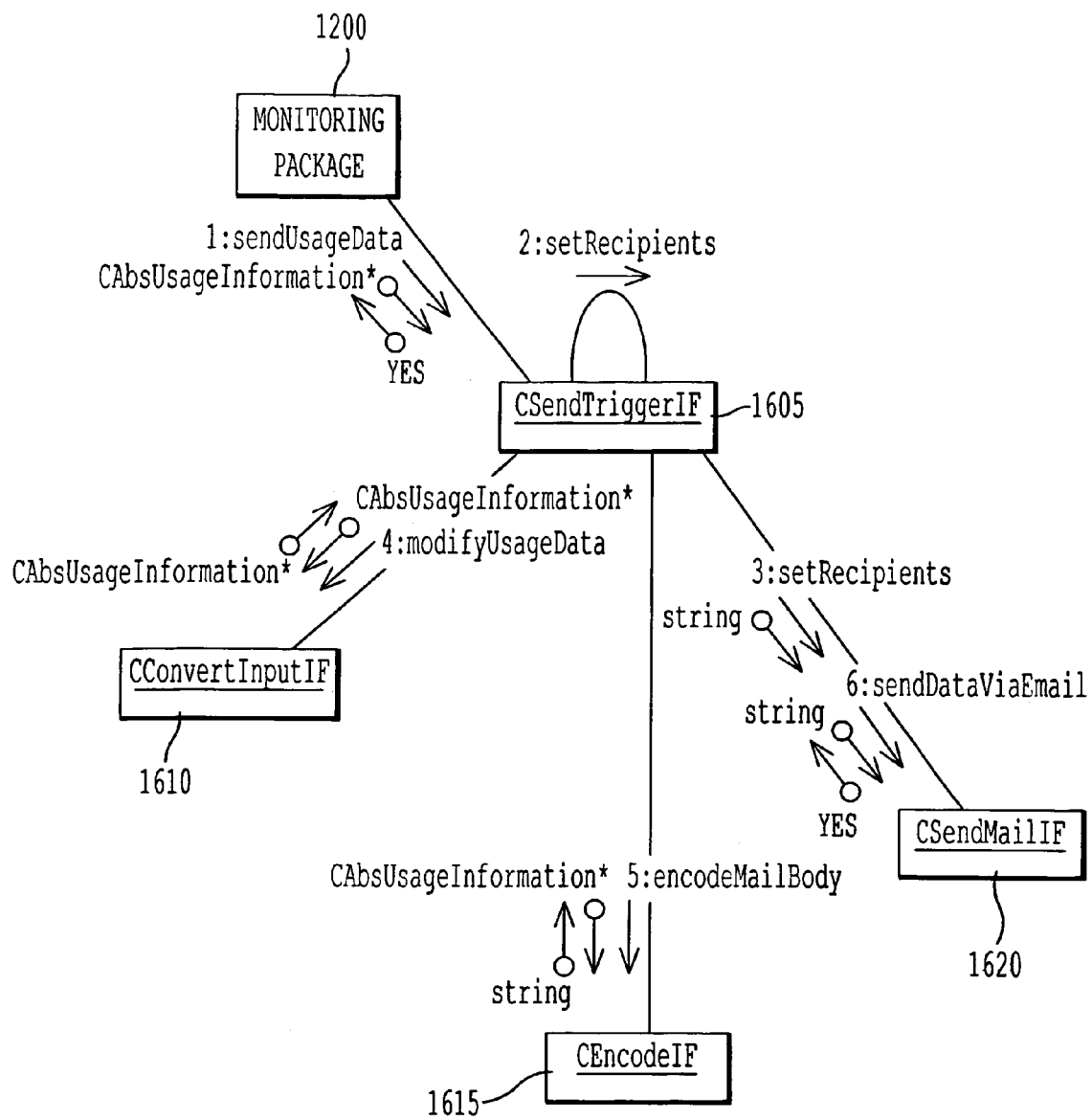
FIG. 21 shows the operation of sending the usage data of the target application in the sending package in the present invention.

FIG. 21 shows the operation of sending the usage data of the target application in the Sending Package 1600. This operation occurs when the target application 505 calls the stopMonitoring function of the Monitoring Package 1200. The operations in FIG. 21 are a continuation of the operations of FIG. 20. The sendUsageData function of the Sending Package 1600, as of step 12, in FIG. 20 corresponds to the sendUsageData function of the CSendTriggerIF object 1605, as of step 1, in FIG. 21.

As shown in FIG. 21, the CSendTriggerIF object 1605 calls its own setRecipients function. Within its own setRecipients function, the CSendTriggerIF object 1605 passes a string as a parameter as it calls the setRecipients function of CSendMailIF object 1620. The string represents the e-mail address to which the Sending Package 1600 will send the usage data of the target application 505. This operation sets the e-mail addresses in CSendMailIF object 1620 so that it will know where to send the usage data of the target application 505.

The CSendTriggerIF object 1605 then passes the CAbsUsageInformation as a parameter as it calls the modifyUsageData function of CConvertInputIF object 1610. The CAbsUsageInformation contains the usage data of the target application 505. The CConvertInputIF object 1610 returns the CAbsUsageInformation to the CSendTriggerIF object 1605. This operation converts the usage data of the target application 505 stored in CAbsUsageInformation. Thus, the usage data in the CAbsUsageInformation passed into the modifyUsageData function of CConvertInputIF object 1610 may differ from the usage data in CAbsUsageInformation returned by this function. For example, the usage data in CAbsUsageInformation passed into the modifyUsageData function may contain information about the sequence of the commands used in the target application 505. This operation may convert the usage data in CAbsUsageInformation so that when it is returned by the modifyUsageData function, it contains information about the frequency of use of the commands used in the target application 505.

As shown in FIG. 21, the CSendTriggerIF object 1605 passes the CAbsUsageInformation as a parameter as it calls the encodeMailBody function of CEncodeIF object 1615. CAbsUsageInformation contains the usage data of the target application 505. The CEncodeIF object 1615 returns a string to the CSendTriggerIF object 1605. The string represents the mail body containing the usage data of the target application 505 that is to be e-mailed to a desired party. This operation encodes and encrypts the usage data in CAbsUsageInformation into the string. Then the CSendTriggerIF object 1605 passes the string as a parameter as it calls the sendDataViaEmail function of CSendMailIF object 1620. The string represents the mail body containing the usage data of the target application 505. The CSendMailIF object 1620 returns a confirmation signal YES to the CSendTriggerIF object 1605 indicating that it was successful in sending the usage data of the target application 505. This operation sends usage data of the target application 505 by e-mail to the desired party.

As noted above with reference to FIG. 14, in the present invention the Monitoring Package 1200 sends the CAbsUsageInformation as a parameter to a sendUsageData function of the Sending Package 1600. That CAbsUsageInformation can vary significantly. More particularly, the information sent from the Monitoring Package 1200 to the Sending Package 1600 depends on the different trigger information and different information as to the number of sessions of the target application 505 to be executed prior to sending information from the Sending Package 1600. As a result, there are variations in the size of the data and the structure of the data to be sent by the Sending Package 1600. As an example, in one feature of the present invention, the monitored data generated from the Monitoring Package 1200 can be sent by the Sending Package 1600 after each usage of a monitored target application 505. As another option, the monitored data can be sent by the Sending Package 1600 after a certain number of sessions (e.g., five sessions) of the monitored target application 505 have been executed. In those two different instances, the amount of data and the structure of the data to be sent by the Sending Package 1600 will vary significantly.

In one embodiment of the present invention, different algorithms are provided within the Sending Package 1600 for each different type of data. However, that embodiment results in the Sending Package 1600 becoming very complicated in requiring algorithms to address all the different forms of the data provided from the Monitoring Package 1200. A further drawback with the Sending Package 1600 addressing the different forms of the data is that the algorithms in the Sending Package 1600 would have to be updated every time a change was made in the monitoring operation of the Monitoring Package 1200.

In an alternate embodiment, the Sending Package 1600 is designed to be independent of the differences in data output from the Monitoring Package 1200. That is, the present invention may further utilize an approach which avoids requiring complicated algorithms which would require significant updating in the Sending Package 1600 to address all the different data sizes and structures output from the Monitoring Package 1200. More particularly, the present invention may further utilize a system which defines an abstract class to interface between the Monitoring Package 1200 and the Sending Package 1600. This operation in the present invention allows the Sending Package 1600 to be isolated from the details of the CAbsUsageInformation sent from the Monitoring Package 1200. That is, with this approach, the Sending Package 1600 treats all of the CAbsUsageInformation sent from the Monitoring Package 1200 the same and does not have to determine how the data is represented and how much data is included in the CAbsUsageInformation (e.g., how many sessions of data are included therein, the data structure, etc.) Even more particularly, as shown in FIG. 14, the CAbsUsageInformation is passed from the Monitoring Package 1200 to the Sending Package 1600 as an abstract class.

Specific details of utilizing an abstract class for the CAbsUsageInformation passed from the Monitoring Package 1200 to the Sending Package 1600 is disclosed in further detail in Applicants' copending U.S. application, the entire contents of which are hereby incorporated herein by reference.

Further, an abstract class can be utilized to package the CAbsUsageInformation and to encode the CAbsUsageInformation prior to the CAbsUsageInformation being passed from the Monitoring Package 1200 to the Sending Package 1600. Also, an abstract class can be utilized to validate and encode the CAbsUsageInformation prior to the Sending Package 1600 sending the usage data. More specific details of encoding and packaging the CAbsUsageInformation passed from the Monitoring Package 1200 to the Sending Package 1600 and the encoding and validating of the CAbsUsageInformation within the Sending Package are disclosed in Applicants' copending U.S. patent applications. The entire contents of each of those applications is hereby incorporated herein by reference.

As noted above, in the present invention, usage of a target application 505 is monitored and logged in the Monitoring Package 1200 and is then sent by "store-and-forward" or direct communication by the Sending Package 1600.

A further feature of the present invention is an efficient manner of logging or storing the usage data by the Monitoring Package 1200 of a current session of the target application 505.

Figure 22:
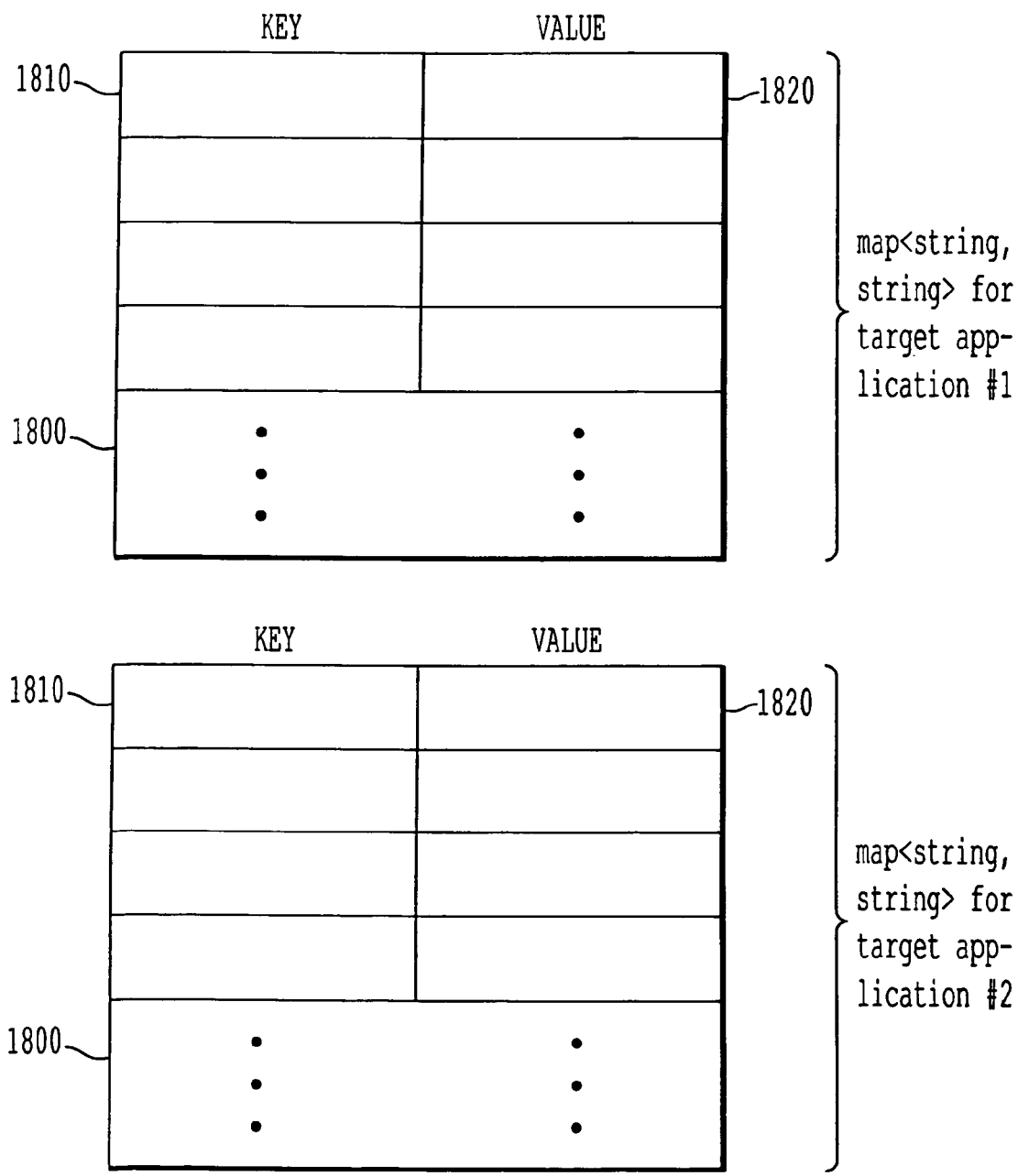
FIG. 22 shows a first map structure which can be utilized to store data in the present invention.

Even more particularly, FIG. 22 shows a map structure 1800 which can be utilized to store usage data of plural target applications 505, and particularly in a situation in which a target application 505 is a target software application. In that instance, the maps 1800 shown in FIG. 22 can store data as to how a user is utilizing either of the software applications as the target application 505. Utilization of the maps 1800 is performed in the CUsageData object 1325 shown in FIGS. 13, 16, 17, 18, 19 and 20 above. That is, the CUsageData object 1325 can include functions of storing data in and retrieving data from a map 1800 such as shown in FIG. 22.

The maps 1800 shown in FIG. 22 store information about the type of usage data, i.e. a key, in a key portion 1810, and its corresponding value in a data value portion 1820. The type of usage data, i.e. the key, is mapped to its corresponding value to allow easy storage and access of the usage data, which in the example noted above is data indicating a user's usage of a target software application. The maps 1800 store specific information about the usage of each of the target applications but also allow new usage data to be logged thereto. As a result, a benefit of utilizing such a map structure in the present invention is that the map 1800 allows a Monitoring Package 1200 to be extended to log new types of usage data about the target application 505.

Typically, the usage data is stored in the maps 1800 as strings. The usage data of a target application 505 may not be collected as strings, but can be converted into strings before being stored in the map 1800. By storing all usage data in the maps 1800 as strings, the storage and access of the usage data from the maps 1800 can be simplified.

The maps 1800 of FIG. 22 may be implemented utilizing a template, map, etc. of the standard template library (STL), the map class CMap of the Microsoft Foundation Class (MFC) library, or a dictionary in the Perl programming language, as examples. The maps 1800 allow one value to be associated, or mapped, to another value, and includes the key portion 1810 and the data value portion 1820 such that each key is associated with a value. Several functions can be used to store and access the keys and values in the map 1800. The keys and values may be of any type, including integers or strings, although as noted above it may be preferable to store all the usage data in the keys and values as strings to simplify storage in and accessing of the usage data from the map 1800. In that instance, the map 1800 is used to map a string to a string.

The maps 1800 are used in the Monitoring Package 1200 to log usage data from plural sessions of one or more target applications 505. The usage data may be logged into the map 1800 and may include several data fields directed to a user's usage of a target application 505, e.g., a target software application, including a user ID, an application ID, the cumulative number of sessions of the target application, a start time of the target application, a duration of the target application, etc.

In one embodiment in which multiple instances of a target application cannot be run simultaneously, these data fields can be stored into the system registry as a kind of global variable. However, if multiple instances of an application can be run simultaneously, the data needs to be stored such that each application can read and write the data without interfering with the operation of the other applications. Such data independence also guarantees that one application finishing does not overwrite the usage and frequency information stored by another application that is still running or that previously finished.

Examples of the maps 1800 shown in FIG. 22 are shown in FIG. 23 as maps 1900 with specific data stored therein for each of two target applications. The maps 1900 are examples of maps used to log usage data from two sessions, which, in this example, are target software applications. The key portions 1910 of the maps 1900 represent strings, and the data value portions 1920 of the maps 1900 also represent strings. Each key is a string representing a type of usage data of the target software application. Each key describes what its corresponding data value represents. In the maps 1900 shown in FIG. 23, the key "UserID" represents the name of the user utilizing the target software application and the key "StartTime" represents the time that the target software application was started. Each data value in the maps 1900 is a string representing the actual usage data. The other examples of the keys shown in the maps 1900 in FIG. 23 are the keys "ApplicationID" indicating the name of the target software application for which usage is being monitored, and "CummulativeUse" indicating the number of times that the specific target software application has been utilized.

In the specific example of maps 1900 shown in FIG. 23, the value mapped to the key "UserID" for the target application indicates the name of the user of the target software application, and the data value corresponding to the key "StartTime" indicates the time that the user started utilizing the target software application. Further, the value "MB" corresponding to the key "ApplicationID" indicates that the usage of the target application with the software name MB is being monitored. Similarly, the data value 45 corresponding to the key "CummulativeUse" indicates that the target software application MB has been used 45 times. For the second target application, different values are stored for each of the keys.

The maps 1900 in FIG. 23 only show four types of usage data, but clearly the maps 1900 can be used to contain additional data with respect to monitoring usage of the target software application. Further, by expanding the data logged in the map 1900, the Monitoring Package 1200 can be extended to log new usage data directed to the target software application.

Figure 24:
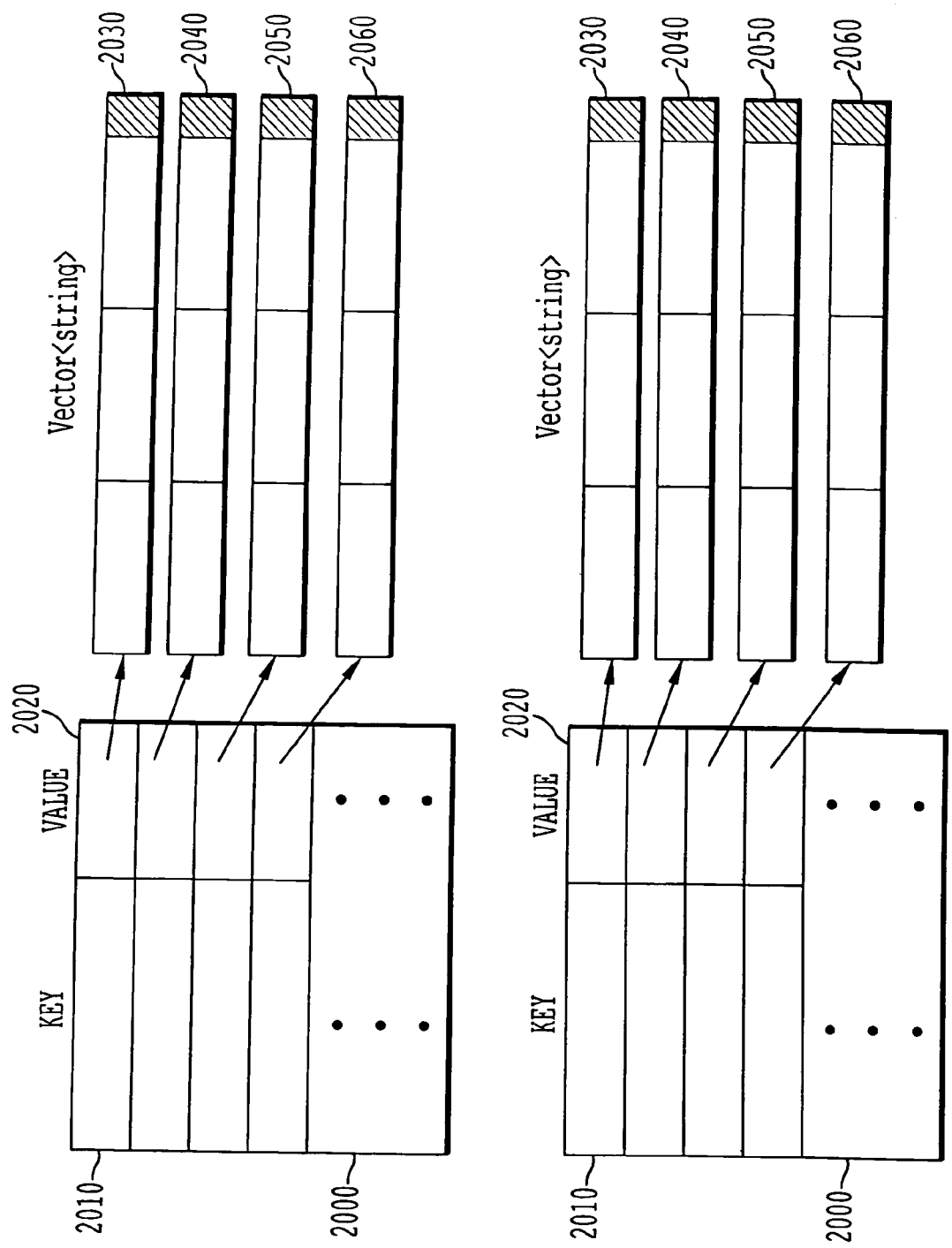
FIG. 24 shows a second map structure which can be utilized to store data in the present invention.

FIG. 24 shows a second map structure which can be utilized by the CUsageData object 1325 to store usage data of a target application 505, again particularly when those target applications are software applications. In the maps 2000 shown in FIG. 24, the keys in the key portion 2010 are strings, and the data values in the data value portion 2020 are vectors. The term vector, in this sense, is directed to an array of any type. The vectors may be implemented using the template, vector, of the standard template library (STL), as one example. In the maps 2000 shown in FIG. 24, each of vectors 2030-2060 are arrays of strings. Thus, the maps 2000 are used to map keys (in string form) to vector data values in which the vectors contain strings.

Such maps 2000 can be utilized in a Monitoring Package 1200 to log usage data directed to the selecting of commands of each target software application. In the embodiment shown in FIG. 24, four entries, i.e., four keys and their corresponding four values, are utilized in the maps 2000 to log usage data about the target software applications. One vector is utilized for the names of the commands used, and the second vector is utilized for the information associated with the commands. The keys for those two vectors are strings indicating the type of information contained in the vector.

Figure 25:
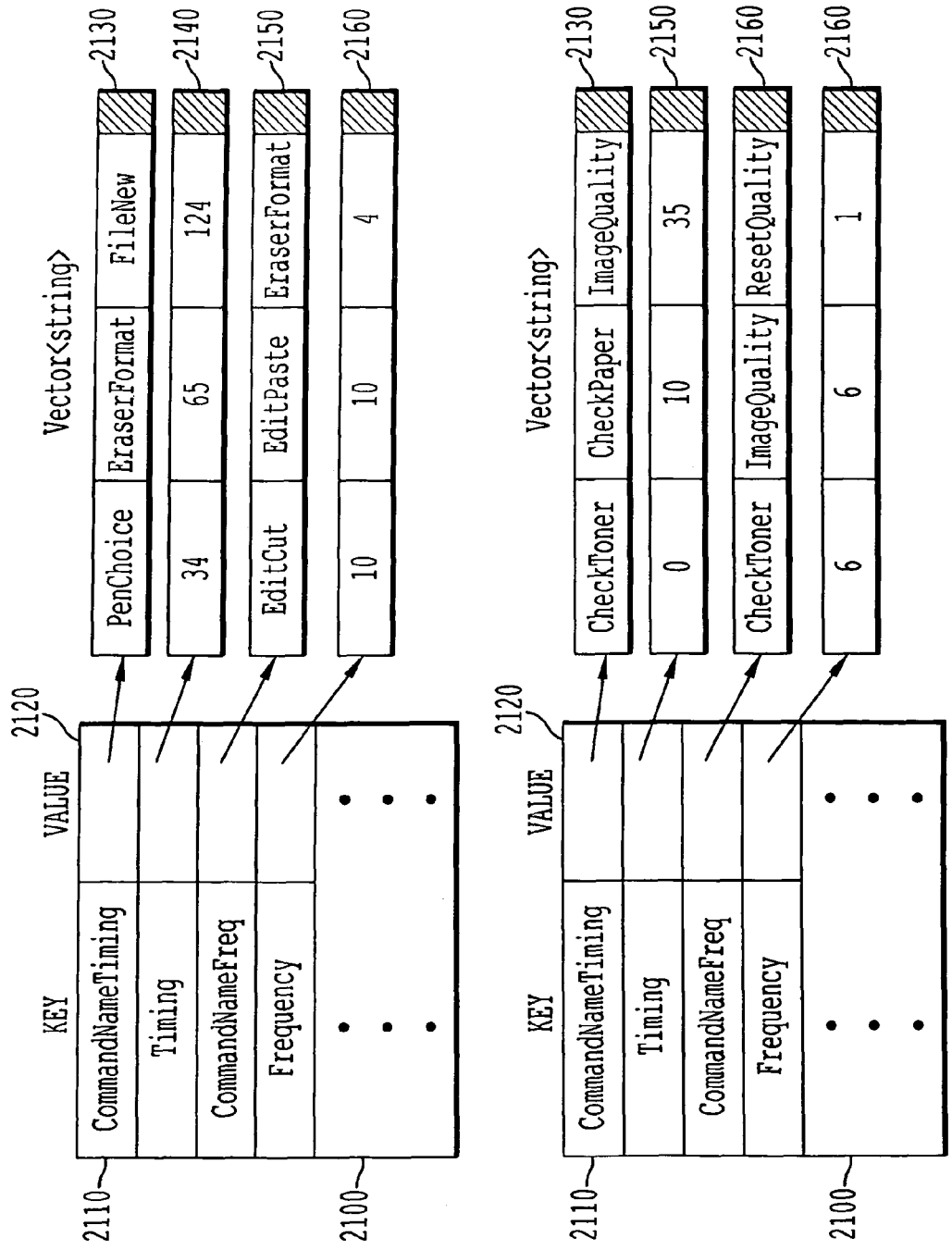
FIG. 25 shows specific examples of data which can be stored in the second map structure of FIG. 24 in the present invention.

FIG. 25 shows a specific example of maps 2100 corresponding to the maps 2000 of FIG. 24 but with specific examples of keys and data values inserted therein. The example shown in FIGS. 24 and 25 is again directed to an example in which two software-based target applications 505 monitor a user's usage of the user interfaces corresponding to those applications.

In the maps 2100 of FIG. 25, the key is a string representing the type of information contained in the corresponding vectors. The data value is the vectors 2130-2160 containing strings that represent information about the commands used in the target software applications.

In the example shown in FIG. 25, one characteristic monitored in both applications is the "CommandNameTiming." This is tracked using the first key and corresponds to vector data 2130 containing the names of the commands for which usage was monitored. In this example, those commands (for application MB) are "PenChoice", "EraseFormat", "FileNew," etc. As also shown in FIG. 25, in the maps 2100, the key "Timing" is included and the corresponding vector data 2140 contains a time elapsed since the start of the target software application in which the commands listed in vector 2130 were used. Thus, for the application "MB," the two keys "CommandNameTiming" and "Timing" and their corresponding vectors 2130 and 2140 provide a log of a timing from a start of a target software application until a specific command was utilized by a user. That is, the vector data corresponding to the key "CommandNameTiming" corresponds to the vector data for the key "Timing" so that the command name "PenChoice" is associated with 34, the command name "EraserFormat" is associated with 65, the command name "FileNew" is associated with 124, and so forth.

Thus, in the maps 2100 shown in FIG. 25 the vector data 2130 and 2140 indicate the timing from the start of a target software application until certain commands are used. The time was measured in tenths of a second. In the specific example shown in FIG. 25 for the application "MB," the vector data 2130 and 2140 indicate that the command "PenChoice" was selected 3.4 seconds after the start of a target software application, the command "EraserFormat" was selected 6.5 seconds after the start of the target software application, and the command "FileNew" was selected 12.4 seconds after the start of the target software application. Similar timing and frequency information is stored for the application "Diagnosis."

The vectors 2130-2160 may contain large amounts of data about the command usage of the target software applications. By utilizing such a vector structure any new commands can be easily added to the vectors 2130-2160. Thus, the Monitoring Package 1200 may log new commands of the target software application without any modifications. Moreover, entries may be added to the map 2100 about other information of the commands, i.e., additional vectors may be added.

In the example shown in FIG. 25, keys "CommandNameFreq" and "Frequency" are also shown and the corresponding vectors 2150 and 2160 store information about the number of times certain commands are used in the target software applications. More particularly, as noted above the first two keys in the maps 1200 are used to log usage data about the use of commands in the target software applications. The first two keys "CommandNameTiming" and "Timing" log usage data of the number of tenths of a second from the starting of a target software application until a certain command is selected. In the map 2100 shown in FIG. 25, the keys "CommandNameFreq" and "Frequency" indicate the number of times a certain command is selected. The data values, i.e., the vectors 2150 and 2160, corresponding to the respective keys "CommandNameFreq" and "Frequency" for the application "MB," indicate in the example of FIG. 25 that the command "EditCut" was used 10 times, the command "EditPaste" was used 10 times, and the command "EraserFormat" was used 4 times.

In the figures noted above, strings are used for the keys and the data values in the maps 1800 and 1900 in FIGS. 22 and 23, respectively. In FIGS. 24 and 25, strings are used for the keys of the maps 2000, 2100 and for the values within the vectors. The strings may be arrays of characters and may be implemented using the string template of the standard template library (STL) or the string class, CString, of the Microsoft Foundation Class (MFC) library.

Further, the usage data collected is not used for calculation purposes but for reporting purposes. Therefore, all the usage data collected, whether it is strings, integers, or other types of data, may be stored in the maps as strings. If the usage data collected includes data types other than strings, then the data type may be converted to strings before being placed into the maps or vectors noted above. Keeping all the values of strings allows for simple encoding and encrypting of the usage data before it is sent by the Sending Package 1600 by e-mail.

With the above-discussed operations, the present invention provides a control operation for monitoring a user's usage of user interfaces which are part of plural different target applications or plural instances of the same application. Further, such an operation of the present invention allows data of the monitored usage to be stored and to be transmitted, at appropriately selected times, by a "store-and-forward" protocol (e.g., Internet mail) or by a direct connection. Internet mail is a convenient source of such a transmission because such a transmission of monitored usage data will typically not be time sensitive information. Further, utilizing an Internet mail system to communicate such data can significantly reduce costs of the transmission. Further, since the logged usage data may be sent by Internet mail in the present invention, the logged usage data can be automatically sent to a further computer system which may be programmed to analyze the usage data transmitted by Internet mail. Such an operation is possible because the present invention can greatly increase the efficiency of monitoring and analyzing such usage data.

In its preferred implementation, the present invention utilizes computers having separate housings than the device to which they are attached. This allows the invention to be inexpensively implemented for installations which already have an existing computer for performing the desired processing, thus the new hardware costs may be reduced. Such an arrangement may also permit implementation of the invention without hardware changes to the device. However, if desired, the present invention may be implemented by including the appropriate processing and data storage capabilities in the device which is being monitored and/or controlled in addition to or as an alternative to a separate computer connected to the device.

This application relates to and builds on various concepts which have been disclosed in the cross-referenced patents and patent applications which have been incorporated into this application by reference. This patent application is intended to include not only the inventions disclosed in the related applications, but also the combinations of various features and functions of the individual embodiments which have been disclosed in this and each of the related applications. Thus, a feature disclosed in one of the related applications or patents may be readily applied a concept disclosed in this invention, and also, the concepts disclosed in one or more of the other applications may be applied concepts or features disclosed in other(s) of the applications. Further, an e-mail message may be used for only sending, with communication in the other direction being performed using a different mode of communication, such as one of the other communication modes disclosed herein, or a communication mode disclosed in the related patents and patent applications.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMS, and magneto-optical disks, ROMs, RAMs, EPROMS, EEPROMS, magnetic or optical cards, or any type of media suitable for storing electronic instructions.

Stored on any one or on a combination of computer readable media, the present invention includes software for controlling both the hardware of a computer and for enabling the computer to interact with a human user. Such software may include, but is not limited to, device drivers, operating systems, development tools, and user applications. Such computer readable media further includes the computer program product of the present invention for monitoring a user's interactions with a user interface. The computer code devices of the present invention can be any interpreted or executable code mechanism, including but not limited to scripts, interpreters, dynamic link libraries, Java classes, and complete executable programs.

Obviously, numerous additional modifications and variations of the present invention are possible in light of the above teachings. It is therefore to be understood that within the scope of the appended claims, the present invention may be practiced otherwise than as specifically described herein.

The invention claimed is:

1. An image output device, comprising:
a target application unit residing in and operating in the image output device;
a processor configured to monitor usage operations that are under control of the target application unit operating in the image output device, and to generate a usage log of the monitored usage, the usage log being stored as a map structure including keys and corresponding values, each key being a string representing a type of usage data of the target application unit, wherein each value in the map structure is a vector of values associated with usage data, wherein the processor is configured to begin to monitor the usage operations that are under control of the target application unit in response to a start monitoring command sent by the target application unit to the processor;
a packaging unit configured to package the usage log for sending; and
a communicating unit configured to encode the packaged usage log and to send the encoded, packaged usage log to a remote monitoring system using an application layer Internet protocol.

2. The image output device according to claim 1, wherein the image output device comprises a printer.

3. The image output device according to claim 1, wherein the image output device comprises a facsimile machine.

4. The image output device according to claim 1, wherein the target application unit is a user interface of the image output device.

5. The image output device according to claim 1, wherein the usage log includes a user identification of the user of the image output device.

6. The image output device according to claim 1, where the image output device comprises a multi-function machine.

7. An image output device, comprising:
a target application unit residing in and operating in the image output device;
a processor executing instructions for monitoring usage operations that are under control of the target application unit operating in the image output device, and generating a usage log of the monitored usage, the usage log being stored as a map structure including keys and corresponding values, each key being a string representing a type of usage data of the target application unit, wherein each value in the map structure is a vector of values associated with usage data, wherein the processor is configured to begin to monitor the usage operations that are under control of the target application unit in response to a start monitoring command sent by the target application unit to the processor;
means for packaging the usage log for sending; and
communicating means for encoding the packaged usage log and sending the encoded, packaged usage log to a remote monitoring system using an application layer Internet protocol.

8. The image output device according to claim 7, wherein the image output device comprises a printer.

9. The image output device according to claim 7, wherein the image output device comprises a facsimile machine.

10. The image output device according to claim 7, wherein the target application unit is a user interface of the image output device.

11. The image output device according to claim 7, wherein the usage log includes a user identification of the user of the image output device.

12. The image output device according to claim 7, wherein the communicating means comprises a wireless network.

13. The image output device according to claim 7, wherein the communicating means comprises a wired network.

14. The image output device according to claim 7, wherein the image output device comprises a multi-function machine.

15. The image output device of claim 1, further comprising:
a memory storing a program configured to monitor the usage operations of the image output device when the image output device is under control of the target application unit.

16. A method, comprising:
monitoring usage operations that are under control of a target application unit residing in and operating in an image output device, and generating a usage log of the monitored usage, the usage log being stored as a map structure including keys and corresponding values, each key being a string representing a type of usage data of the target application unit in response to a start monitoring command sent by the target application unit wherein each value in the map structure is a vector of values associated with usage data;
packaging the usage log for sending; and
encoding the packaged usage log, and sending the encoded, packaged usage log to a remote monitoring system using an application layer protocol.

17. The method of claim 16, wherein each value in the map structure is a string including usage data.

18. The method of claim 16, wherein each value in the map structure is a vector of strings, each string including usage data.

* * * * *